US008568320B2

(12) United States Patent  
Leskiw et al.

(10) Patent No.: US 8,568,320 B2  
(45) Date of Patent: Oct. 29, 2013

(54) SYSTEM AND METHOD FOR USING ORTHOGONALLY-CODED ACTIVE SOURCE SIGNALS FOR REFLECTED SIGNAL ANALYSIS

(75) Inventors: Chris Leskiw, Calgary (CA); Ian Gates, Calgary (CA)

(73) Assignee: UTI Limited Partnership, Calgary, Alberta (CA)

(*) Notice: Subject to any disclaimer, the term of this patent is extended or adjusted under 35 U.S.C. 154(b) by 123 days.

(21) Appl. No.: 12/932,609

(22) Filed: Mar. 1, 2011

(65) Prior Publication Data

US 2011/0213234 A1  Sep. 1, 2011

Related U.S. Application Data

(60) Provisional application No. 61/309,327, filed on Mar. 1, 2010.

(51) Int. Cl.  
*A61B 8/00* (2006.01)

(52) U.S. Cl.  
USPC .......................................... 600/437; 600/447

(58) Field of Classification Search  
USPC ................................. 600/437–469  
See application file for complete search history.

(56) References Cited

U.S. PATENT DOCUMENTS

| | | | |
|---|---|---|---|
| 4,472,815 A * | 9/1984 | Gutleber ........................ 375/254 |
| 6,309,356 B1 * | 10/2001 | Ustuner et al. ................. 600/443 |
| 6,547,733 B2 * | 4/2003 | Hwang et al. .................. 600/437 |
| 6,551,246 B1 * | 4/2003 | Ustuner et al. ................. 600/447 |
| 6,638,227 B2 * | 10/2003 | Bae ................................. 600/443 |
| 6,786,097 B2 * | 9/2004 | Song et al. ........................ 73/602 |
| 6,999,025 B2 * | 2/2006 | Poullin ............................ 342/159 |
| 7,066,886 B2 * | 6/2006 | Song et al. ..................... 600/443 |
| 7,952,482 B2 * | 5/2011 | Malocha et al. ........... 340/572.1 |
| 8,169,320 B2 * | 5/2012 | Malocha et al. ........... 340/572.1 |
| 2002/0183618 A1 * | 12/2002 | Hwang et al. .................. 600/437 |
| 2004/0257270 A1 * | 12/2004 | Poullin ............................ 342/159 |
| 2006/0184329 A1 | 8/2006 | Rowan et al. |
| 2007/0016389 A1 | 1/2007 | Ozgen |
| 2007/0032995 A1 | 2/2007 | Chien |
| 2008/0077015 A1 | 3/2008 | Boric-Lubecke et al. |
| 2010/0117804 A1 * | 5/2010 | Malocha et al. .............. 340/10.2 |
| 2011/0135026 A1 * | 6/2011 | Malocha et al. .............. 375/267 |

OTHER PUBLICATIONS

Dagenais, V., eta al."Improved torpedo range estimation using modified fast orthogonal search techniques", OCEANS Sep. 18, 2008, pp. 1-7, 15-18.

International Search Report and Written Opinion issued for PCT/IB2011/000554, dated Aug. 3, 2011, 8 pages.

* cited by examiner

*Primary Examiner* — Sunjay Cattungal  
(74) *Attorney, Agent, or Firm* — Fulbright & Jaworski LLP

(57) ABSTRACT

A system and method for using orthogonally-coded active source signals for reflected signal analysis, such as in seismic exploration, sonar, and/or ultrasound applications. One method comprises inputting an orthogonally-coded active source signal to a target site, where the orthogonally-coded active source signal is sufficiently random to not interfere with a delayed version of itself. A reflected signal is received from the target site, and based at least in part on the sufficiently random orthogonal coding of the active source signal, a determination is made whether the received signal is a reflection of the input active source signal.

22 Claims, 13 Drawing Sheets  
(4 of 13 Drawing Sheet(s) Filed in Color)

SYSTEM AND METHOD FOR USING ORTHOGONALLY-CODED ACTIVE SOURCE SIGNALS FOR REFLECTED SIGNAL ANALYSIS

CROSS-REFERENCE TO RELATED APPLICATION

This application claims priority to U.S. Provisional Patent Application No. 61/309,327 filed Mar. 1, 2010, entitled SYSTEM AND METHOD FOR USING ORTHOGONALLY-CODED ACTIVE SOURCE SIGNALS FOR REFLECTED SIGNAL ANALYSIS, the disclosure of which is hereby incorporated by reference in its entirety.

TECHNICAL FIELD

The following description relates generally to systems and methods for using orthogonally-coded active source signals (e.g., pressure or force signals, such as acoustic signals) for reflected signal analysis (e.g., imaging), such as in seismic exploration, sonar, and/or ultrasound applications, and more specifically certain embodiments disclosed in the description use sufficiently random orthogonally-coded active source signals for reflected signal analysis.

BACKGROUND

Active source signals are sometimes used for discovery and/or analysis of (e.g., imaging of) objects that are obstructed from view. Active source signals, as used herein, refer generally to signals that are input to a target site, penetrate an obstructing medium (e.g., which is obstructing the view of the object that is of interest), and at least a portion of the active source signals may be reflected and captured by receivers for analysis. The captured reflected signals may be processed to discover and/or analyze (e.g., image) the object that is of interest. Thus, an active source signal is one that is transmitted into a target site, and at least a portion of such active source signal may be reflected by object(s) present in the target site, whereby the reflected signal may be captured by receivers and processed to analyze (e.g., image) the object(s) present in the target site. Accordingly, the active source signals are input to a target site, and the reflected portion(s) of such active source signals are information that is desired for analyzing (e.g., imaging) the object(s) present in the target site.

Examples of active source signals include various types of force or pressure signals. One example of active source signals includes force or pressure signals (or "waves") commonly referred to as seismic waves, such as are commonly used in seismic exploration applications. Another example of active source signals includes acoustic signals, such as are commonly used in sonar applications (e.g., submarine navigation), ultrasound applications (e.g., medical imaging, such as sonography), etc.

In the oil and gas industry, geophysical prospecting techniques are commonly used to aid in the search for and evaluation of subterranean hydrocarbon and/or other mineral deposits. Generally, a seismic energy source is used to generate a seismic signal (or "wave") that propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

Currently, there are few options for operators of oil and gas recovery processes to monitor or image the distributions of fluids and solids during the recovery process (e.g., during operation of a well). As a recovery process proceeds, imaging of its current state, i.e. its distributions of pressures and phase saturations, is essential to understand where hydrocarbon (e.g., oil and/or gas) pockets remain in the reservoir to maximize the opportunity to recover the resource with less uncertainty. Imaging a reservoir is difficult because often reservoirs are greater than 300 meters (m) deep, and typically greater than 1,000 m deep.

As mentioned above, one such option is reflection seismic imaging where a large impulse-sounds signal is imposed at the surface or from a well and reflections of the sound waves are used to build an image of the reservoir environment as well as rock layers above and below the reservoir. This makes it possible to "see" the location of the reservoir, potential gas zones, faults, and other features of the underground system. Traditional reflection seismology is intensive because it requires many people in the field and interpretation of the reflections is often subjective and can take weeks to months to process. Seismic imaging is also limited because much of the signal is lost and thus the reflections are degraded during the seismic "shoot". Also, the sound waves have wavelengths of orders of 10 m and higher, thus only features larger than this size scale can be seen within the rock.

There are two traditional modes for seismic monitoring: 1) passive and 2) active. With passive monitoring, listening devices, commonly referred to as geophones, are placed into the ground for listening (i.e., receiving acoustic signals) from a target site. In this passive mode, no active source signals are input to the target site for the purpose of generating reflections for analysis of the site, but instead listening devices merely passively listen for any acoustic signals coming from the target site.

In active monitoring, an active source signal is input to the target site for purposes of generating reflected signals for receipt by receivers and subsequent processing of the reflected signals for analysis of the target site. Traditional active techniques typically require quieting operations at the target site. That is, it is traditionally desirable to minimize/ eliminate external interference sources that may impart interfering signals to the target site during the time that active monitoring is taking place. Thus, in a seismic analysis application, wells or other equipment operating at a target site for extracting subterranean hydrocarbon reserves are stopped and quieted during the time of the active monitoring. This quieting is generally desired to minimize interference signals and make it easier to correlate received reflected signals with the active source signals that are input to the target site. Accordingly, active monitoring techniques are traditionally not performed in real-time time during operation of equipment that is otherwise operating at a target site for other purposes, such as for extraction of hydrocarbon reserves in a seismic application.

Various sources of seismic energy have been utilized in the art to actively impart seismic waves into the earth. Such sources have included two general types: 1) impulsive energy sources, such as dynamite, and 2) seismic vibrator sources. The first type of geophysical prospecting utilizes an impulsive energy source, such as dynamite or a marine air gun, to generate the seismic signal. With an impulsive energy source, a large amount of energy is injected into the earth in a very short period of time. Accordingly, the resulting data generally have a relatively high signal-to-noise ratio, which facilitates subsequent data processing operations. On the other hand, use of an impulsive energy source can pose certain safety and environmental concerns.

Since the late 1950s and early 1960s, the second type of geophysical prospecting has developed, which employs a seismic vibrator (e.g., a land or marine seismic vibrator) as the energy source, wherein the seismic vibrator is commonly used to propagate energy signals over an extended period of time, as opposed to the near instantaneous energy provided by impulsive sources. Thus, a seismic vibrator may be employed as the source of seismic energy which, when energized, imparts relatively low-level energy signals into the earth. The seismic process employing such use of a seismic vibrator is sometimes referred to as "VIBROSEIS" prospecting. In general, vibroseis is commonly used in the art to refer to a method used to propagate energy signals into the earth over an extended period of time, as opposed to the near instantaneous energy provided by impulsive sources. The data recorded in this way is then correlated to convert the extended source signal into an impulse. The source signal using this method was originally generated by an electric motor driving sets of counter-rotating eccentric weights, but these were quickly replaced by servo-controlled hydraulic vibrator or "shaker unit" mounted on a mobile base unit. Roughly, half of today's land seismic data surveys use P-wave hydraulic vibrators for sources. Hydraulic seismic vibrators are popular, at least in part, because of the high energy densities of such devices.

The seismic signal generated by a seismic vibrator is a controlled wavetrain—a sweep signal containing different frequencies—that may be emitted into the surface of the earth, a body of water or a borehole. In a seismic vibrator for use on land, energy may be imparted into the ground in a swept frequency signal. Typically, the energy to be imparted into the ground is generated by a hydraulic drive system that vibrates a large weight, known as the reaction mass, up and down. The hydraulic pressure that accelerates the reaction mass acts also on a piston that is attached to a baseplate that is in contact with the earth and through which the vibrations are transmitted into the earth. Very often, the baseplate is coupled with a large fixed weight, known as the hold-down weight that maintains contact between the baseplate and the ground as the reaction mass moves up and down. The seismic sweep produced by the seismic vibrator is generally a sinusoidal vibration of continuously varying frequency, increasing or decreasing monotonically within a given frequency range. Seismic sweeps often have durations between 2 and 20 seconds. The instantaneous frequency of the seismic sweep may vary linearly or nonlinearly with time. The ratio of the instantaneous frequency variation over the unit time interval is defined sweep rate. Further, the frequency of the seismic sweep may start low and increase with time (i.e., "an upsweep") or it may begin high and gradually decrease (i.e., "a downsweep"). Typically, the frequency range today is, say from about 3 Hertz (Hz) to some upper limit that is often less than 200 Hz, and most commonly the range is from about 6 Hz to about 100 Hz.

In many implementations, vibroseis technology uses vehicle-mounted vibrators (commonly called "vibes") as an energy source to impart coded seismic energy into the ground. The seismic waves are recorded via geophones and subsequently subjected to processing applications. Today, various sophisticated vibrator systems are available for use, including minivibes, truck-mount vibes and buggy-mount vibes, any of which may be selected for use in a given application to provide the best possible solutions to meet a specific seismic program needs.

In seismic exploration, low frequencies (e.g., below 10 Hz) are particularly of interest today due, at least in part, to increased interest in performing acoustic impedance inversion. If seismic data can be obtained that is sufficiently quiet, then the acoustic impedance inversion process can be performed, which may result in some useful geotechnical information. An additional benefit of using low frequencies is that low frequencies penetrate farther than high frequencies, and so their use may permit evaluation of the Earth's subsurface at deeper levels. Further, by including some low frequency content in the data, it may help improve the continuity of reflectors and characteristics being imaged in the subsurface under evaluation.

In addition to the above-mentioned seismic exploration applications, active source signals are commonly employed for other applications, whereby the reflected portion(s) of such active source signals are processed for analysis of the reflector objects present in a target site. For instance, such active source signals are commonly used for medical imaging, acoustic location (i.e., using sound to determine the distance and direction of something), submarine navigation, ultrasound applications (e.g., medical imaging, such as sonography), etc.

For instance, in ultrasound-based medical imaging applications, a sound wave is typically produced by a piezoelectric transducer encased in a probe. Strong, short electrical pulses from the ultrasound machine make the transducer ring at the desired frequency. The frequencies are typically between 2 and 18 MHz. The sound is focused either by the shape of the transducer, a lens in front of the transducer, or a complex set of control pulses from the ultrasound scanner machine (through a beamforming process). This focusing produces an arc-shaped sound wave from the face of the transducer. The wave travels into the body and comes into focus at a desired depth.

Typically, materials on the face of the transducer enable the sound to be transmitted efficiently into the body (usually seeming to be a rubbery coating, a form of impedance matching). In addition, a water-based gel is placed between the patient's skin and the probe. The sound wave is partially reflected from the layers between different tissues. Specifically, sound is reflected anywhere there are density changes in the body: e.g. blood cells in blood plasma, small structures in organs, etc. Some of the reflections return to the transducer.

The return sound wave vibrates the transducer, and the transducer turns the vibrations into electrical pulses that travel to the ultrasonic scanner where they are processed and transformed into a digital image.

In applications that rely upon analysis of reflected portions of an active source signal (also referred to herein as "reflected signal analysis" applications), such as those discussed above, undesired reflections may occur that interfere with the desired reflections. For instance, is seismic applications, heterogeneity in oil and gas reservoirs presents obstacles to identifying reservoir rock and fluid properties. Multiple in-situ rock and fluid discontinuities cause undesired reflections that interfere with the desired reflections used by methods such as reflection seismology and sonar. Similarly, undesired reflections may interfere with desired reflections in medical imaging and other applications that rely on reflections of portion(s) of active source signals.

BRIEF SUMMARY

The present invention is directed generally to systems and methods for using orthogonally-coded active source signals (e.g., pressure or force signals, such as acoustic signals) for reflected signal analysis (e.g., imaging), such as in seismic exploration, sonar, and/or ultrasound applications. According to embodiments of the present invention, orthogonally-coded active source signals (e.g., pressure or force signals, such as acoustic signals) are employed for reflective imaging (and/or other reflected signal analysis) of a target site. In certain embodiments, sufficiently random orthogonally-coded active source signals are employed for reflected signal analysis. Further description of a standard to be employed for evaluating whether orthogonally-coded active source signals are "sufficiently random", as that phrase is used herein, is provided further herein.

As discussed further herein, sufficiently random orthogonal codes do not interfere with delayed versions of themselves. That is, delayed versions of sufficiently random codes are distinguishable and trackable from the incident signal, and therefore the reflected signal analysis may, in certain implementations, be performed continuously as the incident and reflected versions do not correlate with each other. That is, the reflected signal analysis may be performed continuously over some period of time (which may encompass lengthy periods of time, such as hours, days, etc.), wherein the "continuous" operation means that transmission of the active source signals does not stop for the process to record reflections. Thus, in accordance with certain embodiments of the present invention, the orthogonally-coded active source signal is sufficiently random (or unique) within a given window of time during which continuous operation is being performed (i.e., during which a plurality of such active source signals are transmitted serially over the window of time) so that delayed versions of a transmitted active source signal are distinguishable and trackable from the incident signal.

A desire exists for improved, higher resolution, methods to image object(s) through reflected signal analysis. For instance, a desire exists for improved, higher resolution, methods to image underground reservoirs to understand geology (e.g. see where there are barriers to flow or where the high oil saturation regions of the reservoir are) and monitor how a recovery process (i.e., a process for extracting subterranean hydrocarbon reserves from the reservoir) is evolving in a real-time manner as fluids are injected and withdrawn from the reservoir system. According to one embodiment of the present invention, a new method for reflected signal analysis (e.g., imaging) of reservoirs or other objects of interest is provided, which uses coded orthogonal signals that can be done in real-time. An exemplary embodiment is referred to herein as PULSAR (PULse Sequencing, Acquisition and Ranging). One significant advantage of PULSAR is that it can be implemented using existing infrastructure, i.e. wells and pumping equipment, if so desired. To evaluate the PULSAR technique and verify its accuracy, the modeling of multiphase fluid flow is explicitly combined with the modeling of wave equations to simulate the use of orthogonally coded small signal pressure waves to detect rock and fluid properties, as described further herein.

In active reflected signal analysis in accordance with certain embodiments of the present invention, an active, sufficiently random, orthogonally-coded source signal is input to a target site, and some reflection of that source signal is received back by one or more receivers. There may be multiple sources (say 10 sources, for example) that are each simultaneously inputting to the target site different orthogonally-coded source signals, in accordance with certain embodiments of the present invention. Traditional active reflected signal analysis techniques do not provide a method for detecting or determining which received reflection corresponds to which of the input source signals. However, in accordance with certain embodiments of the present invention, the multiple source signals that are input to the target site each have different codes on them. For instance, they are all orthogonal and sufficiently random so they do not interfere (either constructively or destructively) with each other or with delayed versions of themselves. Thus, when a receiver receives the reflected signals, those reflected signals can be decoded in order to determine exactly which of the multiple source signals produced a given reflected signal. Since the orthogonally-coded signals are sufficiently random, in certain embodiments, transmitters and receivers can be co-located and operate continuously as the incident signal and the delayed version are distinguishable.

According to one embodiment, a method comprises inputting, by a source device, an orthogonally-coded active source signal to a target site. As discussed further herein, in certain embodiments, the orthogonally-coded active source signal is sufficiently random such that it does not interfere (either constructively or destructively) with delayed versions of itself. The method further comprises receiving, by a receiver device, a received signal reflected from the target site, and determining, based at least in part on orthogonal coding of the orthogonally-coded active source signal, whether the received signal is a reflection of the input orthogonally-coded active source signal. In certain embodiments, determining whether the received signal is a reflection of the input orthogonally-coded active source signal comprises distinguishing a received signal, or portion thereof, that is a reflection of the input orthogonally-coded active source signal from a received signal, or portion thereof, that is a reflection of an interference signal. In this regard, the interference signal refers to any signal that is input to the target site other than the input orthogonally-coded active source signal.

In certain embodiments, the method further comprises generating, by a signal generator device, the orthogonally-coded active source signal, which again may be a sufficiently random orthogonally-coded active source signal (as discussed further herein). The method may further comprise modulating the generated orthogonally-coded active source signal onto an active source signal being input to the target site by the source device. The source device may comprise active equipment otherwise working on the target site for some purpose other than inputting the sufficiently random, orthogonally-coded active source signal. For instance, in a seismic application, the source device may comprise an injector and/or a valve of equipment operating at the target location for extracting subterranean hydrocarbon reserves from the target location.

In certain embodiments, the method further comprises processing, by a signal processing device, the received signal that is determined to be a reflection of the input sufficiently random, orthogonally-coded active source signal for performing reflected signal analysis. The reflected signal analysis may comprise analysis of at least one object present in the target site, such as imaging of the at least one object. Depending on the desired application, the target site may comprise a subterranean hydrocarbon-bearing reservoir, an internal region of a human or animal body, or other site containing object(s) of interest.

In certain embodiments, the inputting of the sufficiently random orthogonally-coded active source signal to the target site and the receiving of the signal reflected from the target site are performed during operation of at least one interference source on the target site. For instance, such inputting and receiving may be performed during operation at the target location of equipment for extracting subterranean hydrocarbon reserves from the target location.

According to another embodiment, a method comprises inputting, by a plurality of source devices, a plurality of sufficiently random, orthogonally-coded active source signals to said target site. The method further comprises receiving, by at least one receiver device, a plurality of received signals reflected from the target site, and correlating, based at least in part on sufficiently random orthogonal coding of the plurality of orthogonally-coded active source signals, the plurality of received signals with the plurality of input orthogonally-coded active source signals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The patent or application file contains at least one drawing executed in color. Copies of this patent or patent application publication with color drawing(s) will be provided by the Office upon request and payments of the necessary fee.

For a more complete understanding of the present invention, reference is now made to the following descriptions taken in conjunction with the accompanying drawing, in which.

DETAILED DESCRIPTION

Figure 1:
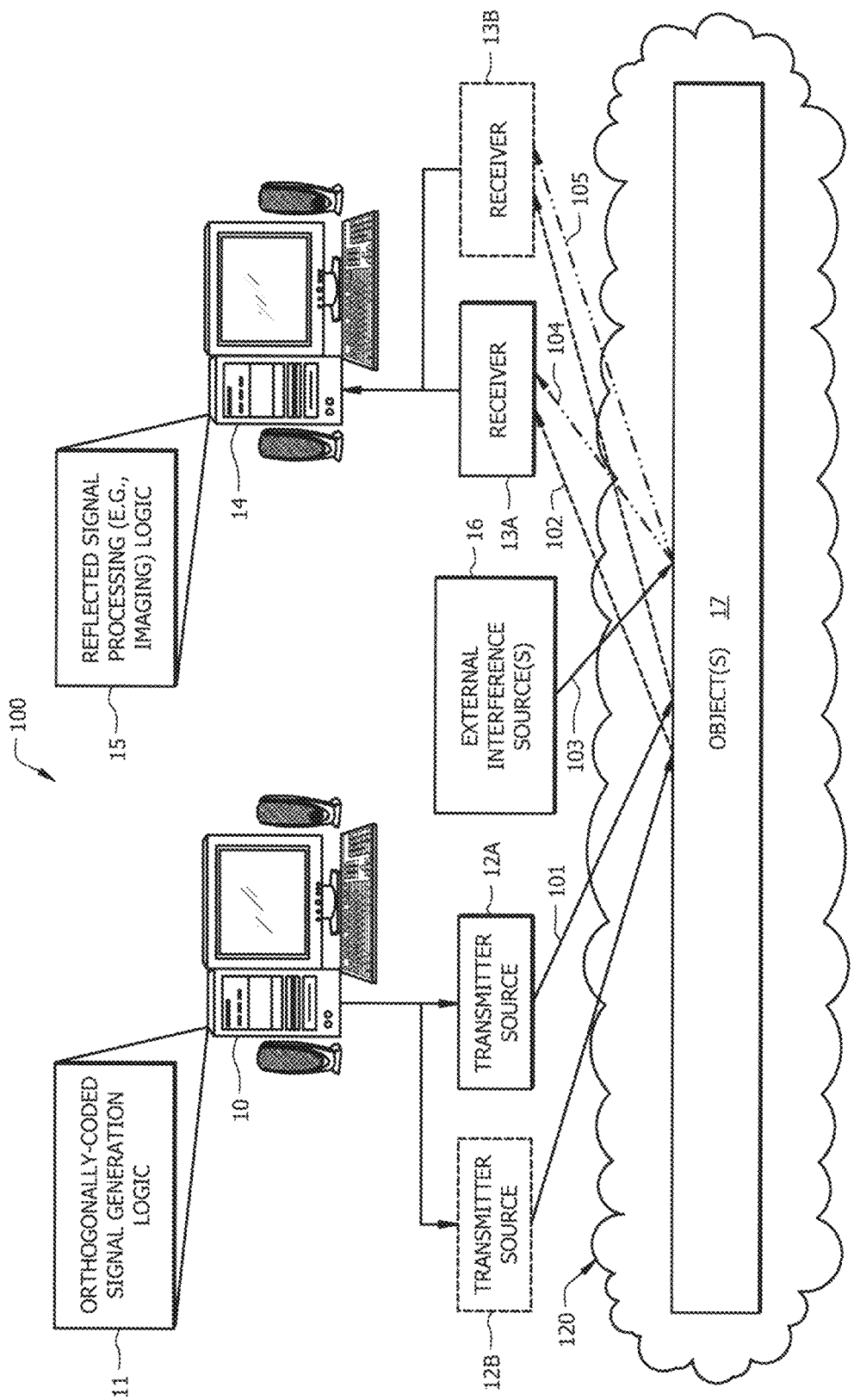
FIG. 1 shows a simplified, block representation of an exemplary system according to one embodiment of the present invention.

FIG. 1 shows a simplified, block representation of an exemplary system 100 according to one embodiment of the present invention. In this example, one or more transmitter sources 12A, 12B are implemented to impart active source signals to a target site 120, and one or more receivers 13A, 13B are implemented for receiving reflected (or "echoed") portion(s) of the active source signals from the target site 120 for analysis of object(s) 17 present at the target site. The target site 120 may be a geographic location (e.g., at which seismic exploration/analysis is desired), a biologic specimen (e.g., portion of a human or animal body being examined, such as for medical diagnosis/treatment), or other site that is desired to be analyzed.

As discussed further herein, the active source signals output by transmitter sources 12A, 12B may be force or pressure signals, such as acoustic signals. In a seismic exploration application, the transmitter sources 12A, 12B may be seismic vibrator sources, for example. As another example, the transmitter sources 12A, 12B may be ultrasound transmitters (e.g., piezoelectric transducers) employed in a medical imaging application. In certain embodiments, the transmitter sources 12A, 12B may be an injector or other equipment operating a site. That is, equipment that is imparting force or pressure signals to a site (e.g., for purposes other than reflected signal analysis) may be leveraged in certain embodiments. For instance, an injector operating at a geographic location from which hydrocarbon reserves are being extracted may be used as the transmitter source. For example, a sufficiently random, orthogonally-coded signal may be modulated onto a carrier signal/wave that is imparted to a site by such injector in the injector's otherwise normal operation, in certain embodiments. While two transmitter sources 12A, 12B and two receivers 13A, 13B are shown in the example of FIG. 1 for ease of illustration and discussion, it should be recognized that any number of transmitter sources and receivers may be similarly employed in a given application, and thus embodiments of the present invention are not restricted in this manner.

According to embodiments of the present invention, the active source signals used are orthogonally-coded signals. For instance, in the exemplary system 100 of FIG. 1, the transmitter sources 12A, 12B may be under the control of a computer 10. According to certain embodiments of the present invention, computer 10 includes orthogonally-coded signal generation logic 11 for generating orthogonally-coded active source signals. In other words, logic 11 may control transmitter sources 12A, 12B to cause those sources to output orthogonally-coded active source signals.

In certain embodiments, the orthogonally-coded active source signals are sufficiently random. To aid in the understanding of how to evaluate whether the orthogonally-coded active source signals are "sufficiently" random, as that term is used herein, consider the following two orthogonal codes as an example:

Code u: 1, 1,−1,−1, 1, 1,−1,−1
Code v: 1,−1,−1, 1, 1,−1,−1, 1

To prove these codes are orthogonal (and uncorrelated), we take the dot product, which should equal zero: 1*1+1*(−1)+ (−1)*(−1)+ . . . =0.

But in a continuous scenario, a delayed version of Code v looks exactly the same as Code u (and vice versa), so depending when we took the dot product or based on the delay of the reflected code, we could have a reflection that correlates perfectly with our incident code, or have a code from another source that has a delay such that it would correlate perfectly with our current source, and therefore be indistinguishable. In essence they would interfere with each other despite being orthogonal.

In one embodiment, referred to herein as "PULSAR," we restrict the type of orthogonal codes to those that satisfy:

$$r_{uu}[k] = \frac{1}{K} \sum_{n=0}^{K-1-|k|} u[n]u[n+|k|] \approx \sigma_u^2 \delta[k]$$

which, in a overly mathematical way states that our code sequence u[0 . . . K−1] when "dot producted" against all delayed versions of itself results in value that is effectively zero (or "sufficiently" zero) except at zero delay.

To find such a sequence u[0 . . . K−1] there must be no relationship between the samples u[a], u[b], u[c] etc. To ensure there is no relationship the code must be generated in a random fashion where each sample is generated independently and its probability is identically distributed (a WHITE random process [note that a Gaussian random process is a white process]). This ensures zero predictability between consecutive samples of u, as well samples at fixed distances apart.

So, the exemplary PULSAR codes are subject to the following "restrictions":
Given two codes (u and v) operating in the same system:

$$r_{uu}[k] = \frac{1}{K} \sum_{n=0}^{K-1-|k|} u[n]u[n+|k|] \approx \sigma_u^2 \delta[k]$$

for both $r_{uu}$, and $r_{vv}$ i.e.—replacing u with v in the above equation must hold true, as well as:

$$u \cdot (u+v) \approx \|u\|^2 + 0$$

$$v \cdot (-u+v) \approx -\|u\|^2 + 0$$

$$v \cdot (u+v) \approx 0 + \|v\|^2$$

$$v \cdot (u+-v) \approx 0 +- \|v\|^2$$

which proves orthogonality.

What defines "sufficient" in a given implementation relates to ones acceptable bit error rate. Since the equations above are based on the assumption that u, v, etc. are white which would require infinitely long codes to be used, we can use codes of finite length (sacrificing a perfect "=" sign for an approximation or "≈" sign) and achieve a desired or "sufficient" bit error rate. The decision of an acceptable value for bit error rate in a given implementation will generally be an engineering decision, which may be made based on many factors like expected system noise, desired transmit power, number of sources etc.

Computer 10 may be any suitable processor-based computing device, such as a personal computer (PC), laptop computer, server computer, workstation computer, etc. In the illustrated example of FIG. 1, orthogonally-coded signal generation logic 11 comprises a software application that is stored to computer-readable medium and is executing on a processor of computer 10. Thus, in this embodiment, orthogonally-coded signal generation logic 11 comprises computer-executable software code stored to a computer-readable medium that is readable by a processor of computer 10 and, when executed by such processor, causes computer 10 to perform the various operations described further herein for generating sufficiently random, orthogonally-coded signals (e.g., controlling transmitter sources 12A, 12B for generating such sufficiently random, orthogonally-coded signals). While orthogonally-coded signal generation logic 11 is shown as executing on computer 10 for ease of illustration in FIG. 1, it should be recognized that such logic 11 may be residing and/or executing either locally on computer 10 or on a remote computer to which computer 10 is communicatively coupled via a communication network, such as a local area network (LAN), the Internet or other wide area network (WAN), etc.

Exemplary system 100 further includes one or more receivers 13A, 13B for receiving reflected (or "echoed") portions of the active source signals. While shown separately, in certain embodiments, the receivers 13A, 13B may be integrated in a common device with transmitter sources 12A, 12B. The receivers 13A, 13B comprise any suitable devices for receiving reflected active source signals, such as reflected acoustic signals for example. Various suitable receivers are known in the art, including those that are commonly employed for seismic, sonar, and medical imaging applications, as examples, and any receiver for receiving reflected acoustic or other active source signals is within the scope of the present invention. In most applications, the receivers 13A, 13B convert the received reflected active source signals to corresponding electrical signals. Thus, the receivers 13A, 13B may comprise analog-to-digital (A/D) converters that convert received analog signals into corresponding digital signals for further processing. For instance, the receivers 13A, 13B may be communicatively coupled to a computer 14, which includes reflected signal processing (e.g., imaging) logic 15.

As with computer 10 described above, computer 14 may be any suitable processor-based computing device, such as a personal computer (PC), laptop computer, server computer, workstation computer, etc. Further, while shown separately in the example of FIG. 1, computers 10 and 14 may be the same computer in certain applications. In the illustrated example of FIG. 1, signal processing logic 15 comprises a software application that is stored to computer-readable medium and is executing on a processor of computer 14. Thus, in this embodiment, signal processing logic 15 comprises computer-executable software code stored to a computer-readable medium that is readable by a processor of computer 14 and, when executed by such processor, causes computer 14 to perform the various operations described further herein for processing the received signals for analyzing object(s) 17, such as for imaging object(s) 17. While signal processing logic 15 is shown as executing on computer 14 for ease of illustration in FIG. 1, it should be recognized that such logic 15 may be residing and/or executing either locally on computer 14 or on a remote computer to which computer 14 is communicatively coupled via a communication network, such as a local area network (LAN), the Internet or other wide area network (WAN), etc.

In most applications, the transmitting system (e.g., computer 10 and transmitter sources 12A, 12B) is in communication with and/or synchronized in some way with the receiving system (e.g., computer 14 and receivers 13A, 13B) such that time-delay information can be computed by the receiving system. That is, the timing relationship between the time of imparting an active source signal by a transmitter source to target site 120 and the time of receipt of a reflected signal at a receiver can be determined. Further, using other knowledge about the active source signal, such as its power, frequency, etc., various information can be derived at the receiving system based on analysis of received reflected signals (e.g., based on the timing and/or strength of such received reflected signals), such as information concerning the depth/location of object(s) 17 within target site 120, as well as certain physical characteristics (e.g., composition, density, etc.) of object(s) 17. Thus, by correlating the received reflected signals with the transmitted active source signals, various information can be derived concerning object(s) 17. Various processing techniques are known for deriving such information, such as those commonly employed for seismic imaging, medical imaging, etc.

As FIG. 1 further illustrates, in some instances, external interference source(s) 16 may be present in system 100. Such external interference sources 16 may generate active source signals that are imparted to site 120, which may result in interfering reflected signals. As one example, operational equipment present operating at a target geographic site (e.g., for extracting hydrocarbon reserves from the site, etc.) may be external interference source(s) 16 which generate interfering active source signals. As another example, external interference source(s) 16 may be present when attempting to perform medical imaging on a patient. For instance, if medical imaging is being attempted while a patient is being transported (e.g., by ambulance or helicopter), interfering vibrational signals may be imparted to the patient by movement of the transport vehicle. Various other external interference source(s) 16 may exist in a given environment. The signals imparted to the target site 120 by such external interference source(s) 16 are considered interference because they may result in reflected signals that interfere with the desired reflected signals (i.e., the reflected signals resulting from the known active source signals imparted by the transmitter sources 12A, 12B). That is, the interference signal(s) imparted by the external interference source(s) 16 are signals that are not known signals that are controllably imparted by the transmitter sources 12A, 12B, and thus they having the potential of distorting the results (e.g., images) that are produced by reflected signal processing logic 15. Accordingly, the interference signals may disrupt the above-mentioned correlation of reflected signals with the active source signals that are controllably imparted by transmitter sources 12A, 12B.

As an example of operation of one embodiment, transmitter source 12A imparts sufficiently random, orthogonally-coded active source signal 101 to the target site 120 that is of interest. Portion(s) of the source signal 101 are reflected by object(s) 17 present within target site 120, thus producing reflected signal(s) 102, which are received by receiver 13A and/or receiver 13B. The received reflected signals may be processed by processing logic 15 for analysis of (e.g., imaging of) object(s) 17. However, as mentioned above, external interference source(s) 16 may be present in system 100, which may generate active source signals 103 that are imparted to site 120, which may be reflected by object(s) 17 to further result in interfering reflected signals 104, 105 that are received by receiver 13A and/or receiver 13B. It becomes desirable to distinguish the desired reflected signals 102 from the interference reflected signals 104, 105. As discussed further herein, embodiments of the present invention employ sufficiently random, orthogonally-coded active source signals, which aid in distinguishing the desired reflected signals 102 from the interference reflected signals 104, 105. In this way, certain embodiments of the present invention enable active analysis of a target site in the presence of external interference source(s) 16 while maintaining or improving detection performance.

Thus, in certain embodiments, active monitoring/imaging may be performed during an ongoing recovery process (e.g., without quieting the target site 120). For instance, an operating well may continue its operations during the active monitoring. As discussed above, traditional active monitoring techniques typically require quieting operations at the target site. That is, it is traditionally desirable to minimize/eliminate external interference sources that may impart interfering signals to the target site during the time that active monitoring is taking place. Thus, in a seismic analysis application, wells or other equipment operating at a target site for extracting subterranean hydrocarbon reserves are stopped and quieted during the time of the active monitoring. This quieting is generally desired to minimize interference signals and make it easier to correlate received reflected signals with the active source signals that are input to the target site. Accordingly, active monitoring techniques are traditionally not performed in real-time time during operation of equipment that is otherwise operating at a target site for other purposes, such as for extraction of hydrocarbon reserves in a seismic application.

Certain embodiments of the present invention enable real-time active monitoring to be performed during operation equipment that is otherwise operating at a target site for other purposes, such as for extraction of hydrocarbon reserves in a seismic application. That is, use of sufficiently random, orthogonally-coded active source signals enable reflections of those signals to be distinguished from the incident signal as well as other interference signals that may be received, thereby enabling monitoring to be performed in the presence of other external interference sources operating at a target site.

Digital wireless communication systems, such as cellular communication systems employing Code Division Multiple Access (CDMA), employ orthogonal and spread spectrum techniques in such a way that noise signals are uncorrelated with the desired signal that is being transmitted. However, while orthogonal codes have been employed in digital wireless communication systems for filtering noise from transmitted communication signals, digital wireless communication is a much different application than use of sufficiently random orthogonally-coded active source signals in an application that uses reflected signals for analyzing a target site. A few of the differences are discussed further below.

In wireless communication systems, the communication contained in the transmitted system is the focus, and it is that information that is desired at a receiving location. In a reflected signal analysis environment, such as those described further herein, the transmitted active source signal is not itself communication that is desired at a receiving site, but instead information is gained about object(s) 17 present in a target site 120 from analysis of the reflected signals (e.g., reflected signals 102). While in a wireless communication system, the transmitted signal itself is the information that is of importance to receive at a receiver, in a reflected signal analysis environment the reflection of an active source signal provides information that is of importance (e.g., for analysis of object(s) 17 present at a target site 120).

In wireless communication systems, orthogonally-coded signals have been used to increase the fidelity of the message being transmitted, without concern over the communication channel. In other words, the primary focus in wireless communication systems is to recover a transmitted signal from whatever channel is being used. In many reflected signal analysis applications, the channel is analyzed, rather than the transmitted message being recovered. In other words, many reflected signal analysis applications effectively focus on channel identification, rather than signal transmission and message recovery.

Also, in typical wireless communication applications, reflections are detected and summed together in an effort to obtain/reconstruct the transmitted signal, whereas in many reflected signal analysis applications, each reflected signal received may be individually analyzed (to determine information about object(s) present in a target site, rather than summing all of the reflected signals together in an effort to recreate a transmitted signal.

Exemplary PULSAR Embodiment. According to one embodiment of the present invention, which is referred to as PULSAR (PULse Sequencing, Acquisition and Ranging) and is described in greater detail below, a new method for reflected signal analysis is disclosed which uses coded orthogonal signals. An exemplary application of the method for imaging reservoirs (e.g., for seismic analysis) is described further below. Of course, the method is not limited in application for seismic analysis, but may likewise be employed for other reflected signal analysis applications, such as for sonar applications, medical imaging applications, etc.

The PULSAR embodiment can be performed in real-time. One advantage of PULSAR is that it can potentially use existing infrastructure in a seismic exploration environment, i.e. wells and pumping equipment.

Overview of the exemplary PULSAR concept. As discussed above, signal analysis and detection methods used in cellular handheld telephones allows dynamic and robust means to send and receive signals. These signals are generated with spread spectrum methods using pseudorandom normal (PN) codes making them resistant to narrow band interference and multipath fading (interference due to heterogeneity). Furthermore the near orthogonality of PN codes makes it possible to take advantage of the reflected and delayed versions of the original signal. The reflections are uncorrelated and thus can be recombined to compensate for the random and heterogeneous properties of the communication link to a cellular telephone as it moves within the cellular network.

In sonar, sinusoidal burst pulses are emitted from a sound source with a measurement of the delay to the received echo pulse. Sonar-like systems suffer from Rayleigh fading where heterogeneity produces multiple unintended sources that cause constructive or destructive interference that result in random amplitude and phases at the receivers. PULSAR uses orthogonal codes and/or pseudorandom codes along with bandwidth efficient modulation schemes which allows the method to distinguish multiple desired signals continuously and simultaneously from unintentional occurring signals, thus permitting high resolution identification of the geological media, its discontinuities, and fluid saturations within the reservoir.

Figure 2:
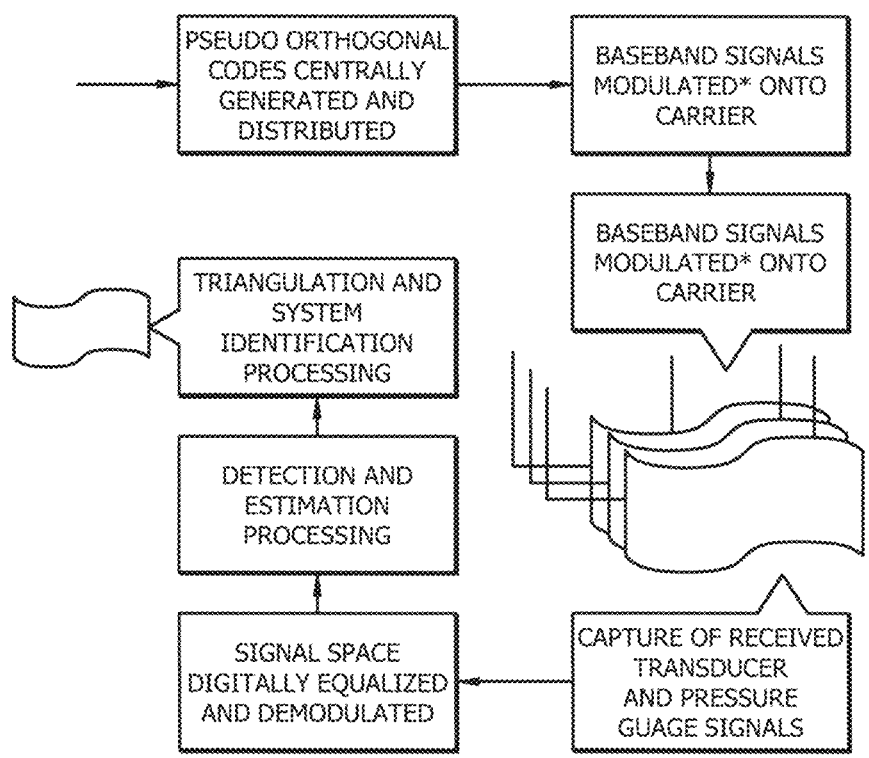
FIG. 2 shows an operational flow for one exemplary application of one embodiment, referred to herein as the PULSAR embodiment, for seismic analysis.

FIG. 2 shows an operational flow 200 for one exemplary application of the PULSAR embodiment for seismic analysis. In operational block 201, pseudo-random orthogonal codes are generated and distributed (e.g., by signal generation logic 11 of FIG. 1). In operational block 202, baseband signals are modulated onto a carrier (e.g., under the control of signal generation logic 11 of FIG. 1). In operational block 203, the resulting carrier signals are transmitted into medium (a target site 120) via transmitting source(s) (e.g., transmitting sources 12A, 12B of FIG. 1), such as transducers, well valves, etc. Reflected signals are captured in operational block 204 (e.g., by receivers 13A, 13B of FIG. 1). The signal space is digitally equalized and demodulated in operational block 205 (e.g., by signal processing logic 15 of FIG. 1). Detection and estimation processing is performed in block 206 (e.g., by signal processing logic 15 of FIG. 1), and triangulation and system identification processing, such as image processing, is performed in block 207 (e.g., by signal processing logic 15 of FIG. 1).

Modeling of Multiphase Fluid Flow in Porous Media. The key properties of a porous medium, such as a subterraneous oil and gas reservoir, include porosity (or void fraction), permeability, phase saturations, and the fluid-rock properties such as the relative permeability and capillary pressure curves which govern multiphase flow in the reservoir. For the fluids, the important properties are their densities, viscosities, and thermodynamic equilibrium behavior which controls the onset of multiple phases in the pore space of the reservoir. In reservoirs, fluids move under gravity or imposed pressure gradients. For each phase in the reservoir rock, the saturation of that phase is denoted by s. The sum of the saturations equals unity:

$$\sum_{all-phases} s_i = 1. \qquad \text{("Equation 1")}$$

In most oil and gas reservoirs three phases exist: aqueous (w), oleic (o), and gaseous (g). Each phase can have any number of components, i.e. the oil phase may be made up of methane, propane, etc., and in each phase the sum of the mass fractions of the components should also add up to unity; that is:

$$\sum_{i=1}^{N} c_{iw} = \sum_{i=1}^{N} c_{io} = \sum_{i=1}^{N} c_{ig} = 1. \quad \text{(``Equation 2'')}$$

The mass balance for a flowing fluid in a porous medium is as follows:

$$\frac{\partial(\phi\rho)}{\partial t} + \nabla \cdot (pv) = q, \quad \text{(``Equation 3'')}$$

where q represents the source or sink term of the fluid, p is the density of the fluid, and v represents the volumetric flow velocity (flow velocity). For laminar flow, the flow rate of a fluid in the reservoir rock is given by Darcy's Law:

$$v = -\frac{K}{\mu}(\nabla p + \rho g \nabla z), \quad \text{(``Equation 4'')}$$

where g is the acceleration due to gravity and μ is the fluid's viscosity. Equations 3 and 4 together give an equation that governs the flow of a fluid in the porous medium characterized by its permeability and porosity and the phase viscosities and densities:

$$\nabla \cdot v_f = \nabla \cdot \left[ -\frac{K}{\mu_f}(\nabla p_f - \rho_f G) \right] = \frac{q_f}{\rho_f}, \quad \text{(``Equation 5'')}$$

where the subscript f denotes a fluid property. In the system described here, at the boundaries of the system, the flow equals zero: $v_f \bar{n} = 0$ ("Equation 6"), where n is the normal vector pointing out of the domain boundary, ∂Ω. The resulting governing equations are:

$$-\nabla \cdot [K\lambda \nabla p - K(\lambda_w \rho_w + \lambda_o \rho_o)G] = q; \quad \text{(``Equation 7'')}$$

$$\lambda = \lambda_w + \lambda_o; \quad \text{(``Equation 8'')}$$

$$\phi \frac{\partial s_w}{\partial t} + \nabla \cdot (f_w(s_w)[v + g(s_w)]) = \frac{q_w}{\rho_w}. \quad \text{(``Equation 9'')}$$

Equation 7 is known as the pressure equation, and Equation 9 is known as the saturation equation. This system of equations is often referred to as the black oil model. Since these equations are coupled linearly and non-linearly through various parameters a solution strategy has to be chosen. The resulting elliptic partial differential equation can be discretized by using a two point flux approximation technique (TPFA) that is commonly employed in industry simulators. The details of the formulation and discretization can be found in Aarnes, J. E., Lie, K. A., and Rustad, A. B., "An Introduction to the Numerics of Flow in Porous Media using Matlab," *Geometric Modelling, Numerical Simulation, and Optimization*, Springer, Berlin Heidelberg, 2007, pp. 265–306; and thus will not be repeated here.

Figure 3:
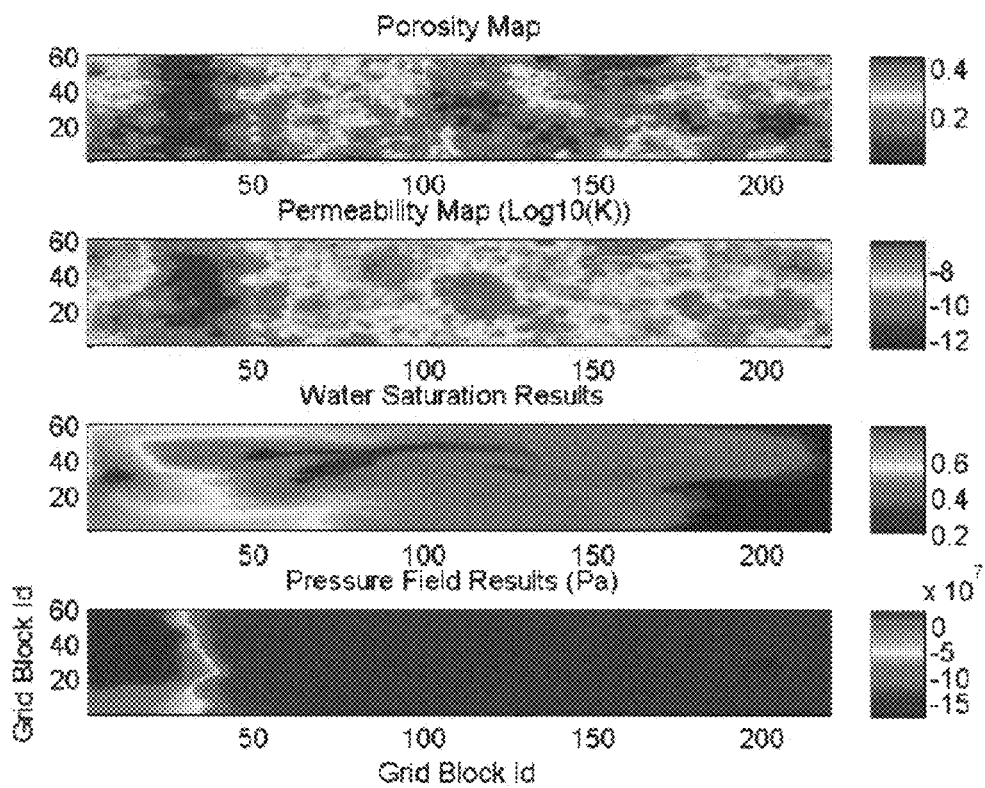
FIG. 3 shows the image results obtained for the top layer of the heterogeneous SPE Test Case 10 reservoir model, including a heterogeneous porosity map, permeability map, and resulting water saturation and pressure gradient from a reservoir simulation performed.

At a given time, the solution for the velocity and pressure field is obtained by solving Equation 7. The pressures and velocities are then input into Equation 9 to solve for the saturation distribution. At the next time step, the procedure is repeated. The porosity and permeability can be spatially distributed. FIG. 3 shows the results for the top layer of the heterogeneous SPE Test Case 10 reservoir model, see "SPE Comparative Solution Project", http://www.spe.org/csp/. FIG. 3 shows heterogeneous porosity map, permeability map, and resulting water saturation and pressure gradient from the reservoir simulation. Irreducible water and oil saturations are 0.2, water and oil viscosities are 0.3 cP and 3.0 cP respectively. The water injector is located in the grid block with x and y indices of 10 and 30, respectively. The producer is located at the grid block with x and y coordinates of 200 and 30, respectively.

Modeling of Waves Through Porous Media. The movement of pressure waves through porous media is governed by:

$$\rho \frac{\partial^2 u}{\partial t^2} = -\nabla p \quad \text{(``Equation 10'')}$$

$$p = -K_m \nabla \cdot u, \quad \text{(``Equation 11'')}$$

which can be shown to be approximately equivalent to the following B/A model:

$$p = -K_m \left[ \nabla \cdot u + \frac{1}{2}\frac{B}{A}(\nabla \cdot u^2) \right], \quad \text{(``Equation 12'')}$$

where p is "acoustic" pressure, ρ is density, $K_m$ is the bulk modulus ($\rho c^2$, c being the speed of sound), B/A is a nonlinear parameter of the medium (equals zero for linear medium) that results from the power series solution of Equations 10 and 11 and u is the particle displacement vector.

Adapting Equation 12 to the heterogeneous reservoir simulation environment is straightforward. The densities of each grid block from the reservoir pressure and saturation solver is updated at each reservoir specific simulation step. To impose the PULSAR signal on the reservoir, the acoustic pressure, i.e. the "signal", is treated as a wave signal superposed on the macroscopic steady state reservoir pressure defined in each grid block. The PULSAR signal is much smaller than that of the reservoir process activities, i.e. signals resulting from injection into and production from the reservoir. PULSAR signals are actually within the noise of the system in this exemplary implementation being described.

When an excitation (in pressure) is applied at some point of time, the macroscopic reservoir simulation state is maintained throughout wave transmission and reception. This is possible because of the large difference in time scales of the reservoir flow and average pressure evolution and sound wave propagation. During the reservoir simulation process, the time steps governing the flow of phases and pressure changes are typically on the order of days. A typical PULSAR time step is several orders of magnitude less; that is, the PULSAR time scale is of order of seconds or fractions of seconds. Therefore, no significant large scale changes will occur to the flow and average pressures within the reservoir as PULSAR operates on the system.

Once a pressure wave transmission is desired, the values from the pressure excitation information are used to calculate the spatial derivatives of the pressure field. Values associated with attenuation are calculated to determine the temporal derivatives of the velocity dV/dt. Time integration yields estimates of the new velocities and allows the estimation of new spatial derivatives of the velocity field. By taking into account previously formulated attenuation, the temporal derivatives are defined for the pressure field dP/dt, and integrate in time to obtain a new estimate for the pressure. These steps repeat until the total simulation time is elapsed.

Figure 5:
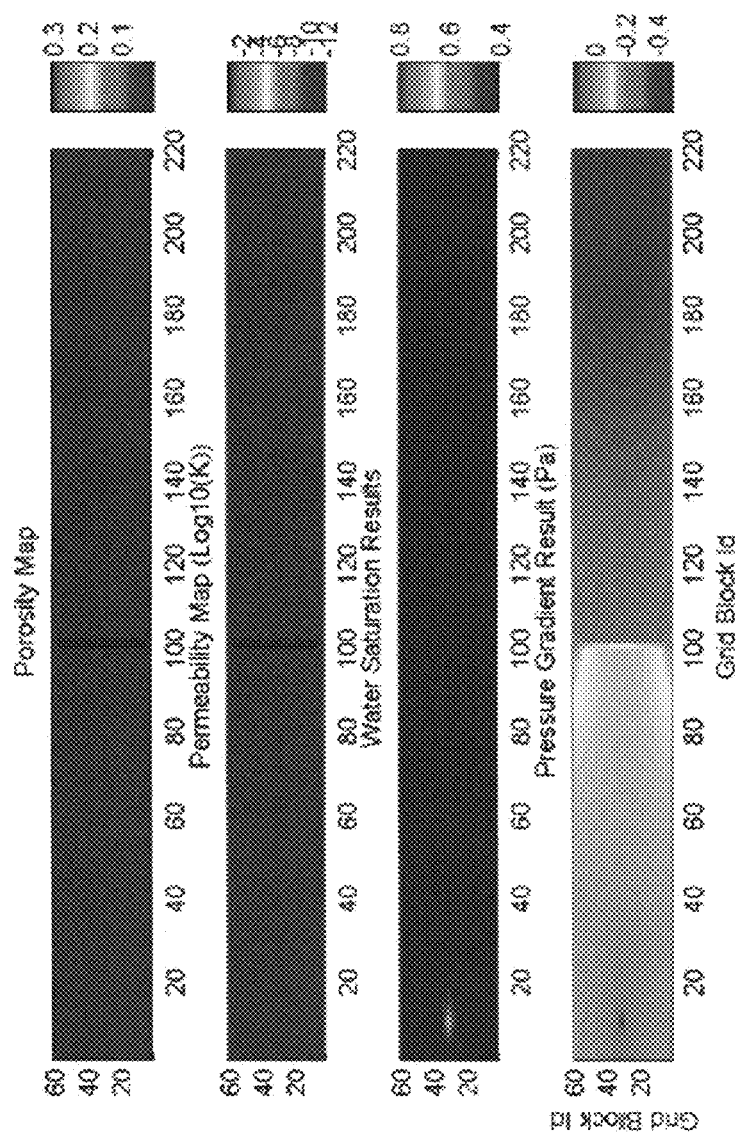
FIG. 5 shows the image results obtained for analysis of porosity, permeability, water saturation and pressure maps at the time of an exemplary nonpermeable barrier reflection test.

Hybrid Flow and Wave Simulation Verification. To verify the reservoir flow and wave simulations were working, in an example, a non-permeable zone is placed within the reservoir model, as shown in FIG. 5. FIG. 5 shows porosity, permeability, water saturation and pressure maps at the time of this exemplary nonpermeable barrier reflection test. The non-permeable, non-porous barrier occupies gridblocks with an x index of 100 and spans y indices from 5 to 55. Irreducible water and oil saturations are 0.2, water and oil viscosities are 0.3 cp and 3.0 cp respectively. Porosity is 0.3 and permeability is 0.3 darcy.

The reservoir properties indicated in FIG. 5 are homogeneous throughout the domain except for the non-permeable zone. In this example, there are two wells within the reservoir. The injector and producer were operated at an imposed injection and production rate equal to 9.4 m3/day (795 m3/day based on the SPE10 test case divided by 85 layers to achieve a rate appropriately scaled to one layer as only the top layer was used for the two dimensional modeling). A sonar signal was imposed on the system to attempt to detect the discontinuities. This example verifies the capability to capture reflections caused by a non-permeable zone as would be the case for a shale barrier.

Figure 4:
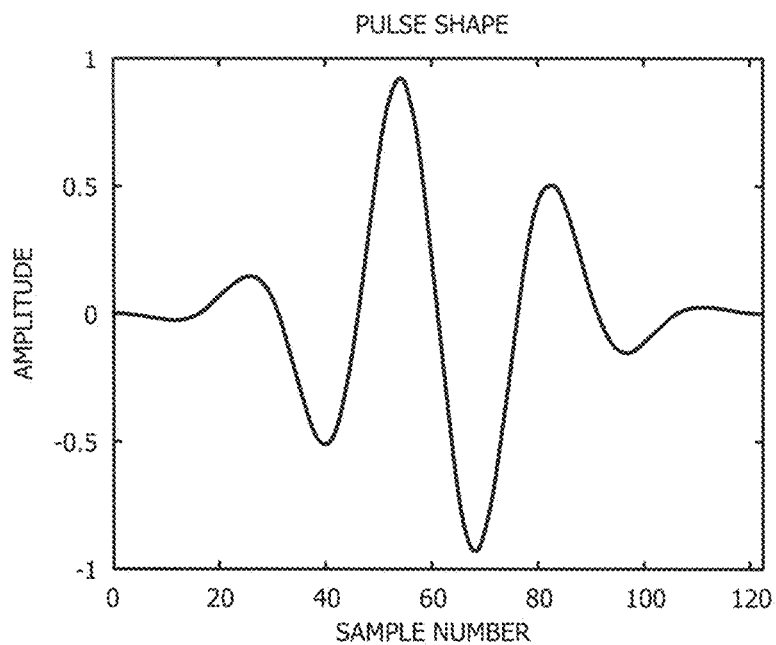
FIG. 4 shows the shape of an imposed excitation pulse used in an exemplary test.

FIG. 4 shows the shape of the imposed excitation pulse in this exemplary test—at this point it is un-coded and reflections are not orthogonal. This is a relatively simple signal used to verify the reservoir and wave propagation models. In underwater sonar applications a chirp signal is used to compensate for different frequency components that are absorbed at different rates. The shape of the signal shown in FIG. 4 is a band limited signal that contains few frequency components. The signal is transmitted from the water injection site at an x grid block index of 10 and a y index of 30. The producer is located at the grid block with x and y coordinates of 200 and 30, respectively.

Figure 6:
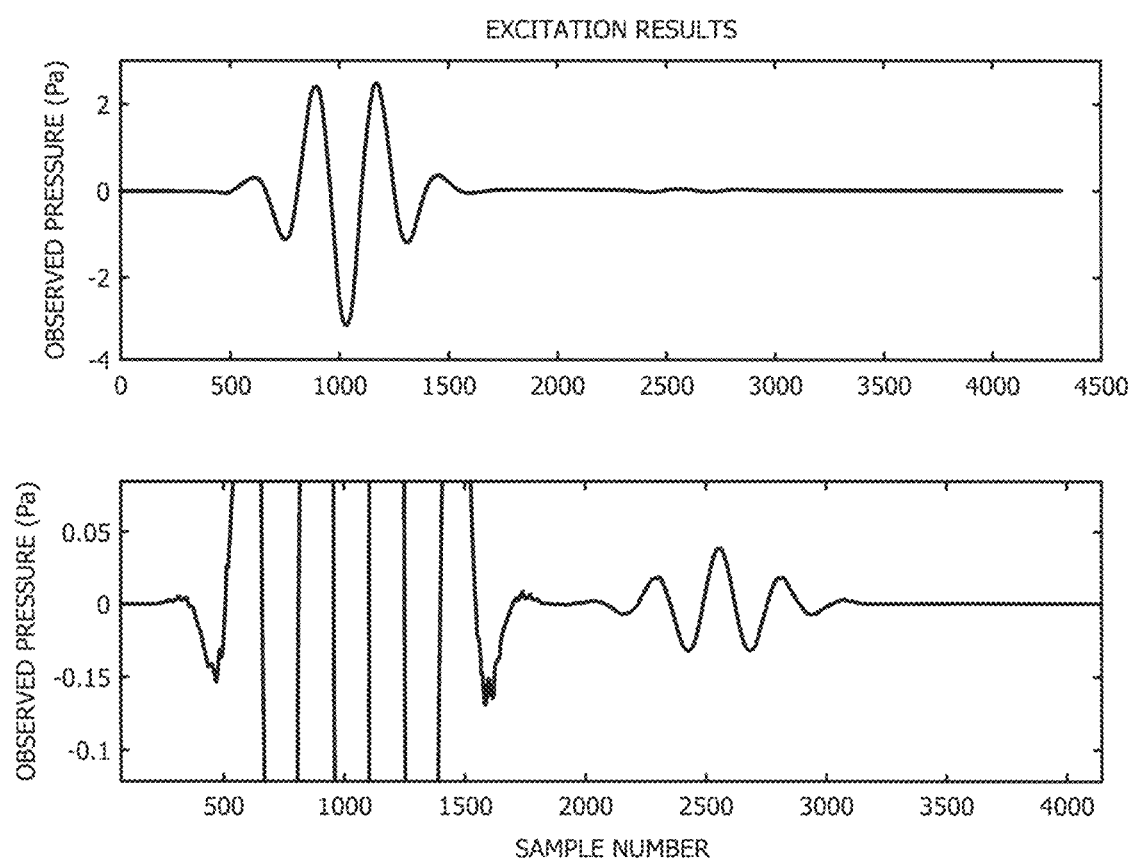
FIG. 6 shows the recorded pressure waves as observed at the location of the transmitter during the exemplary nonpermeable barrier reflection test.

Nonpermeable zone. FIG. 5 shows the setup for the simulation in this exemplary test; it depicts the location of the non-permeable zone deliberately placed in the reservoir. FIG. 6 shows the recorded pressure waves as observed at the location of the transmitter. That is, FIG. 6 shows sensor values at the location of the injector showing incident and reflected deviation magnitudes from the steady state pressure and detects the high quality reflection from the barrier. The response includes the transmitted pulse as well as a smaller reflection. Processing this information to remove the actual reservoir steady state pressure provides the results in FIG. 6. The results reveal that the simulator can be used to verify PULSAR's ability to detect non-permeable zones within the reservoir by using small perturbations of the pressure imposed on the system at the injection well.

Figure 7:
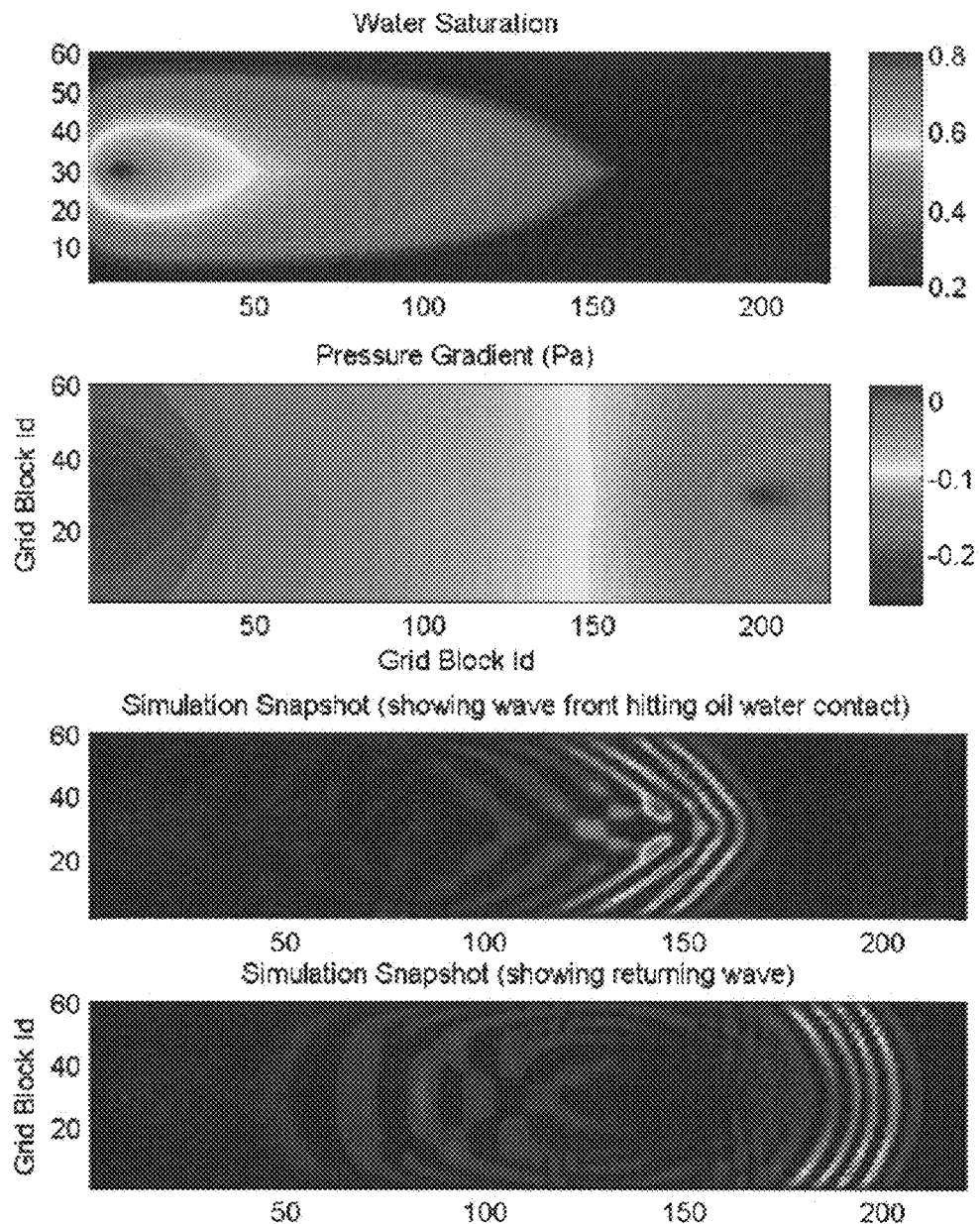
FIG. 7 shows the image results obtained for a second simulation with an oil-water interface in the reservoir with no non-permeable zones.
Figure 8:
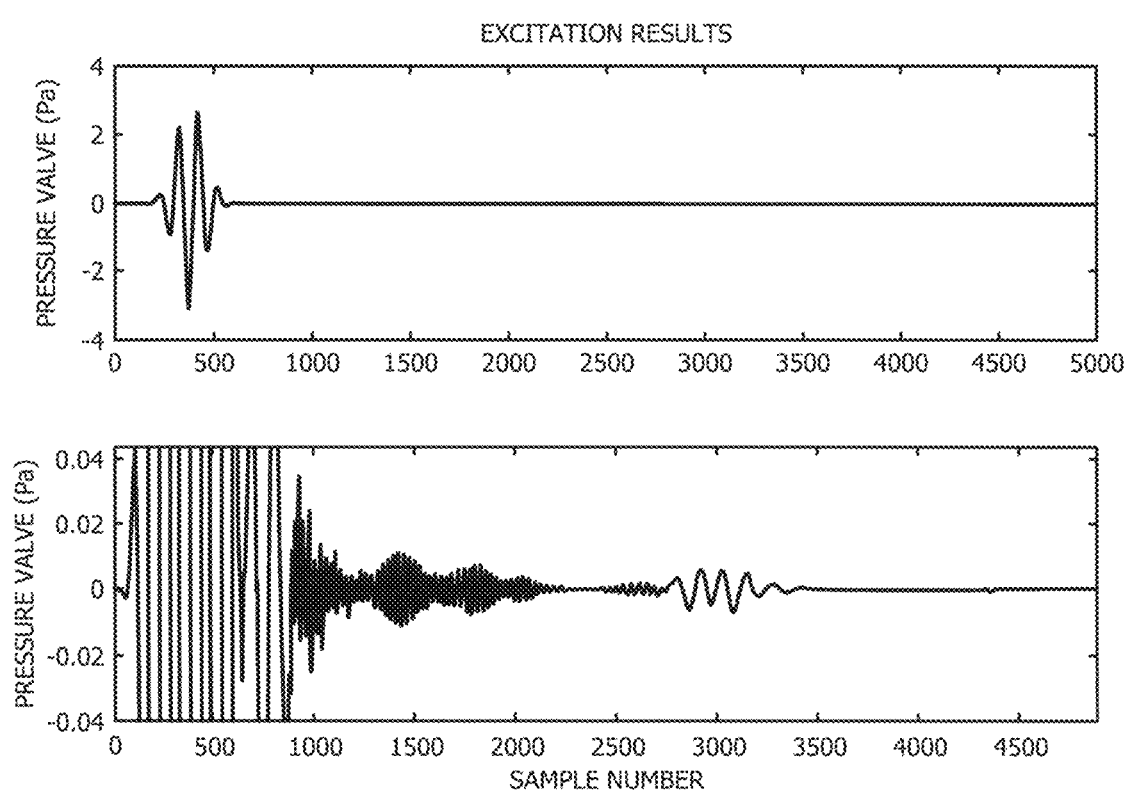
FIG. 8 shows wave graphs illustrating sensor results obtained for fluid boundary detection in this second simulation example at two different scales showing the incident wave and distorted reflections.

In a second example, the simulator is verified with an oil-water interface in the reservoir used in the above example. There are no non-permeable zones in the reservoir model in this second example. The densities of oil and water are sufficiently different so that reflections from it can be used to map phase saturations in the reservoir. The oil saturation in the reservoir is displayed in FIG. 7. FIG. 7 shows results for coupled reservoir and wave simulation showing the water saturation, pressure gradient and highlights the small acoustic deviations in the pressure field at two different time steps, showing both the reflection occurring at the oil water contact as well as the continuation of the incident wave beyond the contact boundary. Thus, FIG. 7 shows the incident and reflected waves which reveal that the simulator can model reflections resulting from the oil-water interfaces. However, the reflection is more diffuse than the actual oil-water interface, since the imposed signals and reflections respond to the density gradient between the phases. FIG. 8 shows wave graphs illustrating sensor results obtained for fluid boundary detection in this second simulation example at two different scales showing the incident wave and distorted reflections.

PULSAR Signal Modulation, Transmission and Detection. For PULSAR, the noise present in the system may be taken to be Gaussian. In one embodiment, this is assumed given that the resulting probability density function (PDF) arising from the sum of many independent noise sources approaches a Gaussian PDF, see e.g., Papoulis, A.,"Probablity, Random Variables, and Stochastic Processes", Fourth Edition, McGraw–Hill, 2001. Since most oil and gas reservoirs are recovered with multiple injectors and producers running simultaneously, it is advantageous to be able to transmit and receive signals to and from various sources. Of course, it is generally desired that PULSAR not interfere with the recovery process itself. To do this, PULSAR uses an orthogonal (or almost orthogonal) pseudo random signal and modulation scheme where interference from neighboring sources is statistically independent from a desired response signal that enables the detection of the desired reflected signal. The heterogeneous environment through which the signals travel may be modeled by a tapped delay line or finite impulse response filter.

Signal Detection of Multiple Signals in White Gaussian Noise. A linear model is used for the porous medium, referred to as a channel, and written in the Bayesian linear form:

$x=H\theta+w$ ("Equation 13"), where H is an N×p observation matrix (N is the number of received samples, p a chosen number of multi-paths of the environment to track), $\theta$ is a random vector, and $w\sim(\theta,\sigma^2 I)$ is a random noise vector independent of $\theta$. The resulting detection problem becomes:

$$H_0: x[n]=w[n]+n=0,1,\ldots,N-1$$

$$H_1: x[n]=s[n]+w[n]n=0,1,\ldots,N-1 \quad \text{("Equation 14")},$$

where H are possible outcomes, x[n] is a received sample, and s[n] is a transmitted signal sample altered by the channel. The effect of the channel can be generalized and made to account for the multipath effects by defining s[n] by:

$$s[n] = \sum_{k=0}^{p-1} h[k]u[n-k]. \quad \text{("Equation 15")}$$

The channel "filter" weights h[k] are allowed to vary randomly due to the scattering nature of the channel. This type of model is typically referred to the random linear time invariant channel model and assumes that the weights are normal random variables such that:

$$h = \begin{bmatrix} h[0] \\ h[1] \\ \vdots \\ h[p-1] \end{bmatrix} \sim N(0, C_h), \quad \text{("Equation 16")}$$

where $C_h=\text{diag}(\sigma_0^2, \sigma_1^2, \ldots, \sigma_{p-1}^2)$. Next, the Bayesian linear model is expanded as follows:

$$H = \begin{bmatrix} u[0] & 0 & 0 & \ldots & \ldots \\ u[1] & u[0] & 0 & & \\ \ldots & u[1] & u[0] & & \\ \ldots & \ldots & u[1] & \ldots & \\ \ldots & \ldots & \ldots & \ldots & \\ u[K-1] & \ldots & \ldots & & \\ 0 & u[K-1] & \ldots & & \\ \ldots & 0 & u[K-1] & & \\ \ldots & \ldots & 0 & & \\ \ldots & \ldots & \ldots & & \end{bmatrix},$$ ("Equation 17")

where the dimensions of H are $(K+p-1) \times p$. For $\theta$:

$$\theta = \begin{bmatrix} h[0] \\ h[1] \\ \vdots \\ h[p-1] \end{bmatrix}.$$ ("Equation 18")

The detector provides the following expression for an estimator-correlator:

$$T(x) = x^T H C_\theta H^T (H C_\theta H^T + \sigma_N^2 I)^{-1} x > \gamma$$ ("Equation 19"), where $C_\theta$ is the covariance matrix of $\theta$, $T(\ )$ is the function that creates a test statistic based on x and is measured against $\gamma$, the decision threshold. This detector is an optimal incoherent multipath combiner and is typically used to combine the multipath versions of the signal to increase the probability of detection of the main transmitted signal. In the exemplary PULSAR embodiment, it is used in a slightly different manner: the signal power in the filter paths is investigated to determine which path contains the most power and thus determine the path delay and relate that to a distance from the transmitter/receiver. To be clear, the above structure uses orthogonal or large PN sequences for the transmitted active source signal u[n]. The autocorrelation of these signals approaches an impulse function:

$$r_{uu}[k] = \frac{1}{K} \sum_{n=0}^{K-1-|k|} u[n]u[n+|k|] \approx \sigma_u^2 \delta[k],$$ ("Equation 20")

where $$\sigma_u^2 = \frac{\varepsilon}{K},$$

the energy of the signal and $\delta(\ )$ is the impulse function. Equation 20 implies that $H^T H = \varepsilon I$. By using the matrix inversion lemma along with:

$$z[k] = \frac{1}{K} \sum_{n=k}^{K-1+k} x[n]u[n-k],$$ ("Equation 21")

allows T(x) to be expressed in the simpler form as:

$$T(x) = \sum_{k=0}^{p-1} \frac{\varepsilon \sigma_k^2}{\varepsilon \sigma_k^2 + \sigma_N^2} \left(\frac{z(k)}{\sqrt{\varepsilon}}\right)^2 > \gamma.$$ ("Equation 22")

Figure 9:
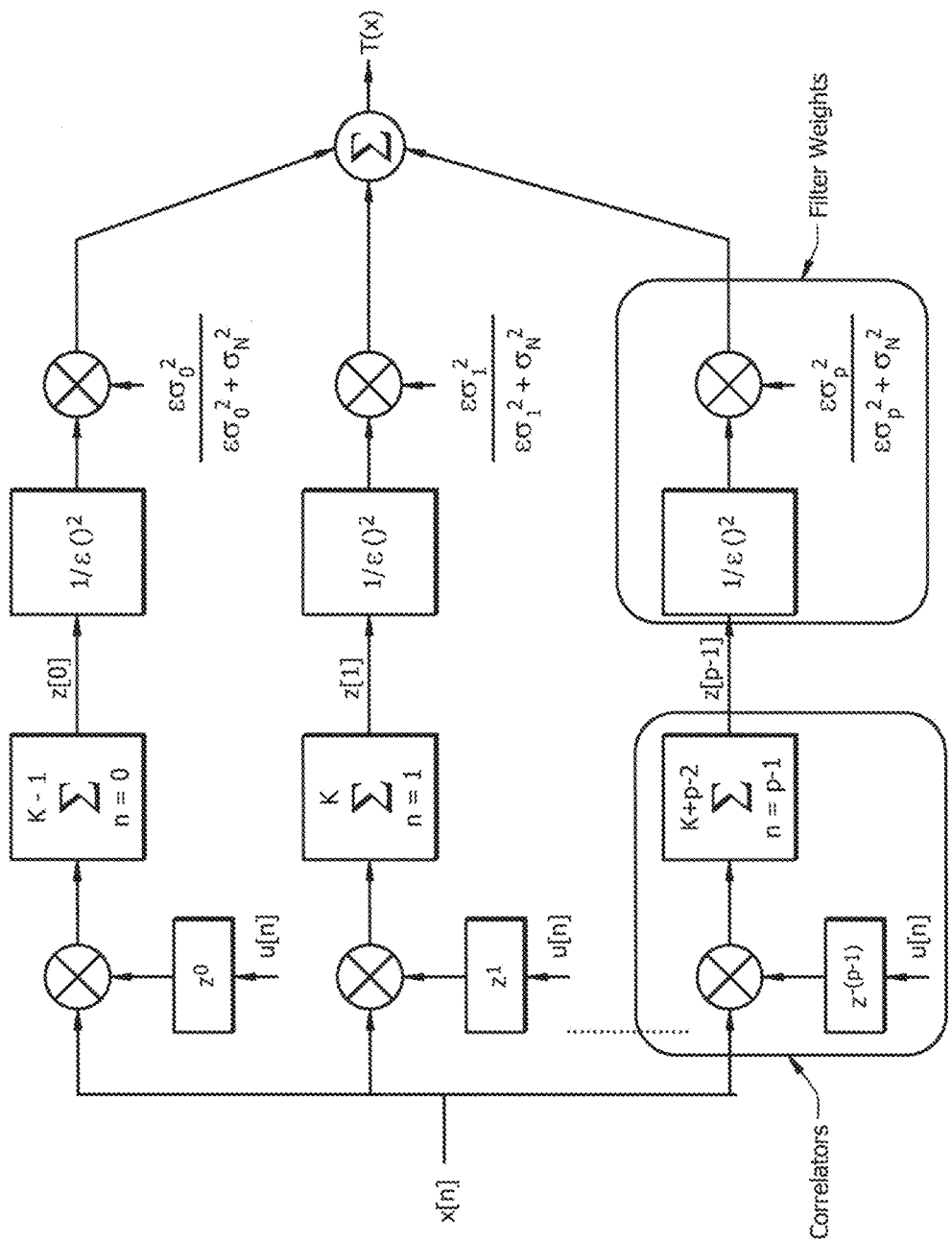
FIG. 9 shows an exemplary multipath combining estimator correlator structure, which transforms a vector of received samples into a single valued estimate that is proportional to the probability that x was sourced by signal u at the transmitter.
Figure 10:
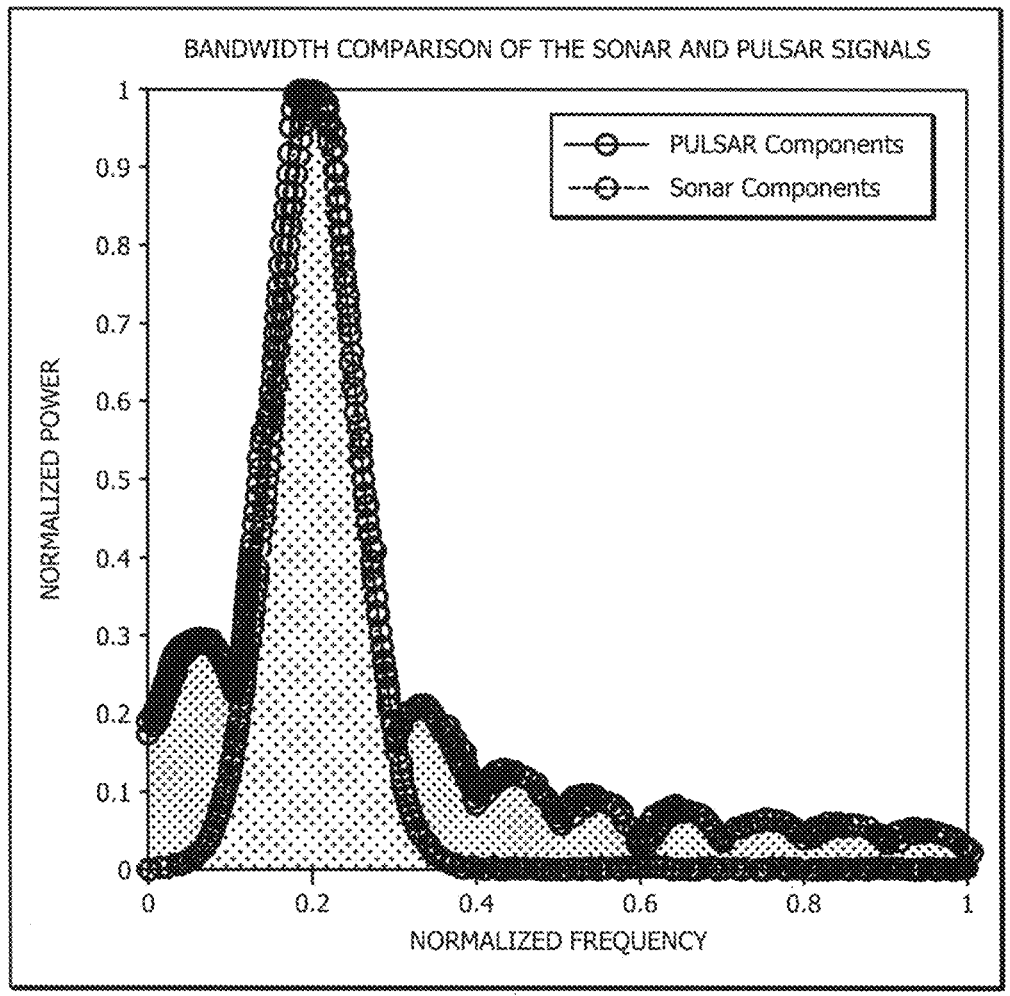
FIG. 10 shows a graph illustrating signal frequency content comparison of typical sonar signals with PULSAR PN signals according to one embodiment.

This transformation is visualized in FIG. 9, where an exemplary multipath combining estimator correlator structure 900 is depicted, which transforms a vector of received samples into a single valued estimate that is proportional to the probability that x was sourced by signal u at the transmitter. All or a portion of the structure 900 shown in FIG. 9 may be implemented in hardware (e.g., digital logic gates) or software that is stored to a computer-readable medium and executable by a processor-based device.

Choice of u[n]. The use of pseudorandom codes for the active source signal, u[n], in this exemplary embodiment not only aids in detection after transmission but it also permits the use of unique codes by various transmission points in the same medium simultaneously as they are nearly orthogonal. Therefore, detection of signals from various sources simultaneously may be performed. Let u and v be two almost orthogonal vectors. It can be shown based on dot products:

$$u \cdot (u+v) \approx \|u\|^2 + 0$$ ("Equation 23");

$$u \cdot (-u+v) \approx \|u\|^2 + 0$$ ("Equation 24").

Similarly:

$$v \cdot (u+v) \approx 0 + \|v\|^2$$ ("Equation 25");

$$v \cdot (u+-v) \approx 0 + -\|v\|^2$$ ("Equation 26").

With the superposition of multiple near orthogonal signals in a medium, a specific chosen signal can be detected from the set of all signals present in the medium. Now that detection of multiple sources from the medium is possible, time of arrival information is used to triangulate features or discontinuities in multidimensional space, identifying x, y and z location as well as size, see operational block 207 of the exemplary operational flow of FIG. 2. The effect of multiple PN transmitters in the system is an increase in No ¾—the noise of the system which increases the probability of bit error.

Modulation of the Pressure Field in Homogeneous and Heterogeneous Media. Although the solution represented by Equations 17 to 19 applies to any arbitrary signal u[n], the processing employed in this exemplary embodiment for modulation and demodulation has not yet been described. Transmitting baseband pulses is not typical at low power levels because the transfer of signal energy is not as efficient with step pulses with typical antennas and transducers. Therefore, to deliver information and energy into the medium at relatively low power levels, the PULSAR sequence may be modulated onto a carrier signal that the medium will accept, see operational block 202 of the exemplary operational flow of FIG. 2. To convert the near orthogonal pseudo random codes into signals that can be delivered to the media, a bandwidth efficient phase-shift keying (PSK) scheme is adopted, in this exemplary embodiment, to modulate the signal carrier. To balance the minimization of bit error rate with bandwidth efficiency, Quadrature Phase–Shift Keying (QPSK) may be used. In the cellular telephone industry, binary phase-shift keying is widely accepted as the most robust PSK method, but careful use of QPSK can achieve a similar bit error rate and data rates with half the bandwidth requirement. Although the bandwidth through the channel is limited, it is desirable to maximize the use of the available bandwidth with a signal comprised of diverse spectral content. The PN codes used here to modulate the carrier provide a wide band of frequencies that will fade independently.

The modulation step (e.g., operational block 202 of FIG. 2) can be avoided in certain embodiments by employing complex adaptive digital equalization techniques at the transmitter or receiver. In one embodiment of the implementation of PULSAR, the pulse is modulated on top of a steam or water injection process in the form of pressure waves with a recursive least square lattice filter (see e.g., Haykin, S., "Adaptive Filter Theory", Fourth Edition, Prentice Hall, 2002) as an adaptive equalizer to recover the digital pulses after being transmitted through a band-limited medium. Similarly, in one embodiment of the implementation of PULSAR, the pulse is pre-distorted and then modulated on top of a steam or water injection process in the form of pressure waves with an adaptive pre-distortion process to compensate in advance for a non-linear, band-limited medium.

Power Levels, Probability of Error and Accuracy. The probability of a bit error is linked to the modulation scheme. For QPSK this is given by:

$$P_b = Q\left(\sqrt{\frac{2E_b}{N_o}}\right),$$ ("Equation 27")

where $E_b$ is the expected energy per bit, $N_o$ is the noise power and Q( ) is the Q function. Note we can control our modulation implementation so that:

$$E_b = \sigma_1^2$$ ("Equation 28"), while $$N_p = \sigma_N^2$$ ("Equation 29").

Even in the presence of a bit error, the probability of detection ($P_D$) can remain high as the rest of the demodulated sequence will correlate well with the desired signal. This implies that the detection performance is proportional to the test statistic T. Let:

$$E\{T : H_0\} = 0$$ ("Equation 30")
$$E\{T : H_1\} = A$$
$$\text{var}\{T : H_0\} = \frac{\sigma^2}{N} \text{ then,}$$
$$P_D \sim \frac{N \cdot A^2}{\sigma^2}.$$

Thus our detection performance can be refined by either increasing our signal to noise ratio or by increasing our code length N.

Ranging accuracy is a function of the sample rate at the receiver with respect to the speed of the small signal pressure waves in the medium:

$$d_r = c_p \cdot T_s$$ ("Equation 31"), where $d_r$ represents the resolution distance, $c_p$ is the speed of the small signal pressure wave of the path taken, and $T_s$ is the sample period. So, if the speed of the pressure wave is estimated at 2000 m/s, then a sample period of 0.5 ms provides 1 m range resolution along that path. If analyzing a reflection the distance travelled is actually double so the same accuracy achieved with half the sample frequency. Therefore:

$$d_{rr} = c_p \cdot \frac{T_2}{2},$$ ("Equation 32")

where $d_{rr}$ is the distance resolution based on reflection processing. With a pressure wave speed of 2000 m/s and a sample period of 1 ms one would achieve an estimated accuracy of 1 m based on reflection processing. This is much more accurate than the current capability of conventional seismic technology.

PULSAR For Reservoir Imaging and Process Monitoring. In this example, the homogeneous reservoir model used in the above-described sonar test case is reused but with a PULSAR excitation shown in FIG. 11. FIG. 12 shows distance results after four simulation runs with the discontinuity relocated in each run. The injection and production wells are operated under constant flow rates as previously described. In this example, the wave equations are solved with the imposed small amplitude pseudorandom sequences and QPSK modulation techniques for excitation.

A key difference between PULSAR signals and those used in sonar and ultrasonic applications is the continuous complex nature of the waveform which as embedded within it a "rich" amount of information. The PULSAR embodiment employs continuous operation over some period of time—i.e., transmission does not stop to record reflections. This appears to be one differentiator between the PULSAR embodiment and traditional ultrasonic methods that use orthogonal codes. It appears that ultrasonic applications typically perform 2 "shoots" and record data, then repeat the procedure. The frequency spectrum of the PULSAR signal is diverse which aids in detection. Detection is further improved by the fact that the transmissions can run continuously allowing for multiple estimates of the locations of features within the reservoir.

Figure 11:
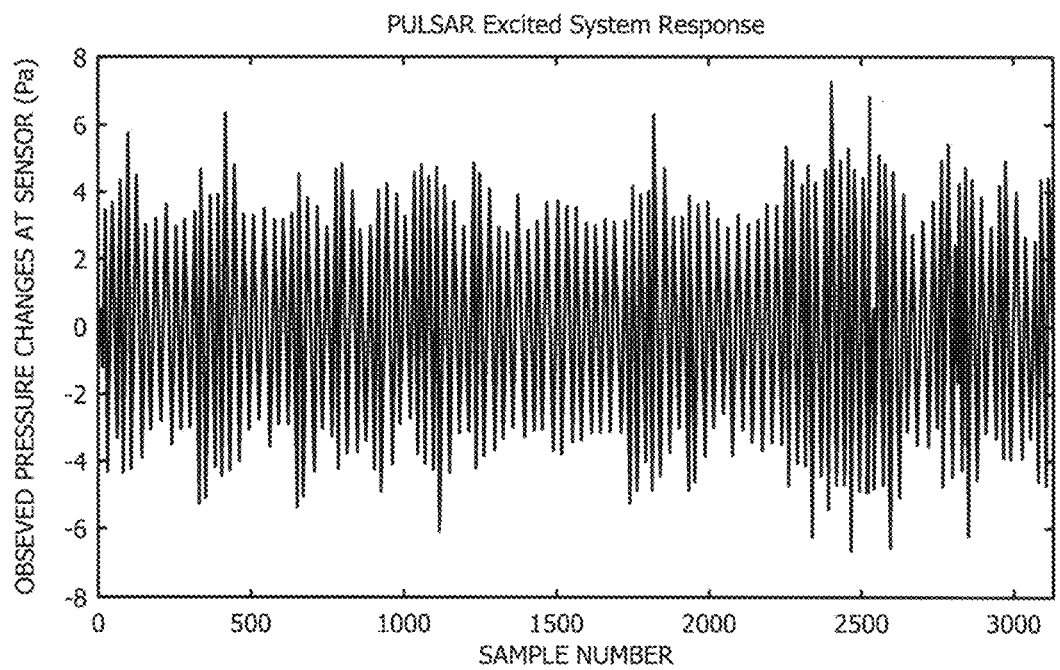
FIG. 11 shows a graph illustrating a typical PULSAR excitation signal.
Figure 12:
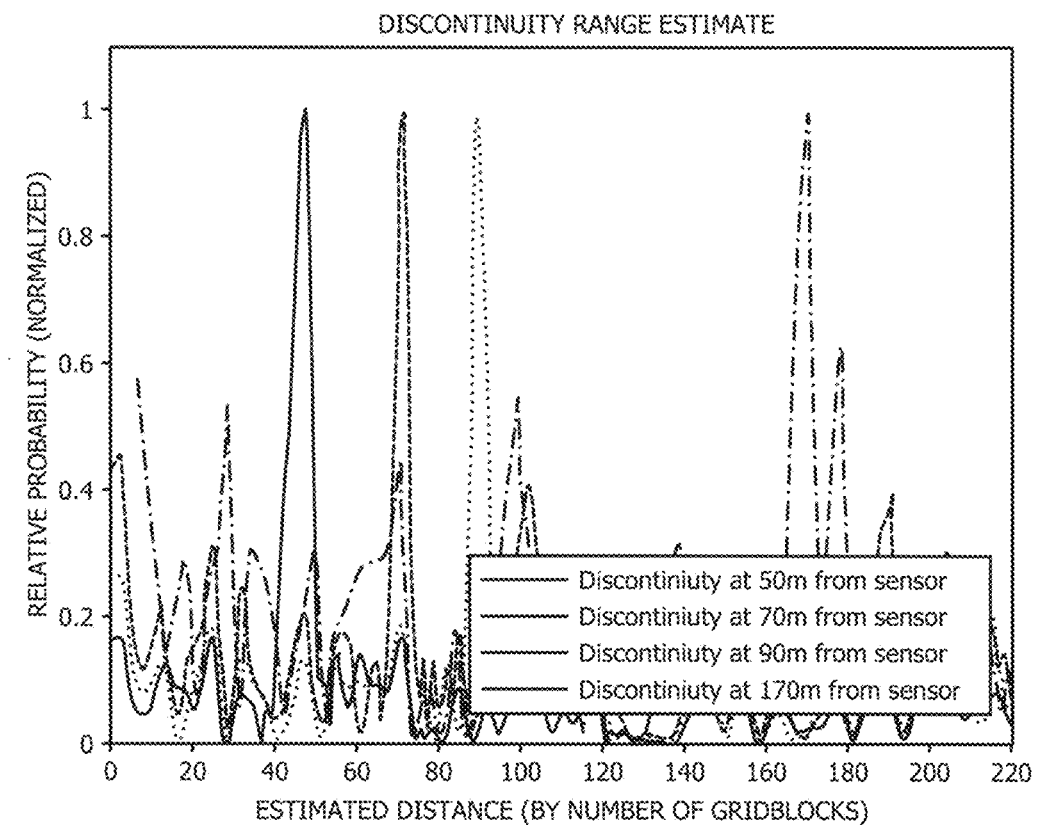
FIG. 12 shows a graph illustrating distance results after four simulation runs in a sonar test case with a PULSAR excitation, with the discontinuity relocated in each run.

FIG. 11 shows sensor values during a PULSAR QPSK transmission, and illustrates that they are significantly different than those of a seismic shot or sonar pulse. FIG. 12 shows the results after demodulation and detection for the various cases. It shows good probability of detection for the non-permeable zones added to the reservoir. This clearly demonstrates the capability of PULSAR to detect fine-scale features within the reservoir.

Figure 13:
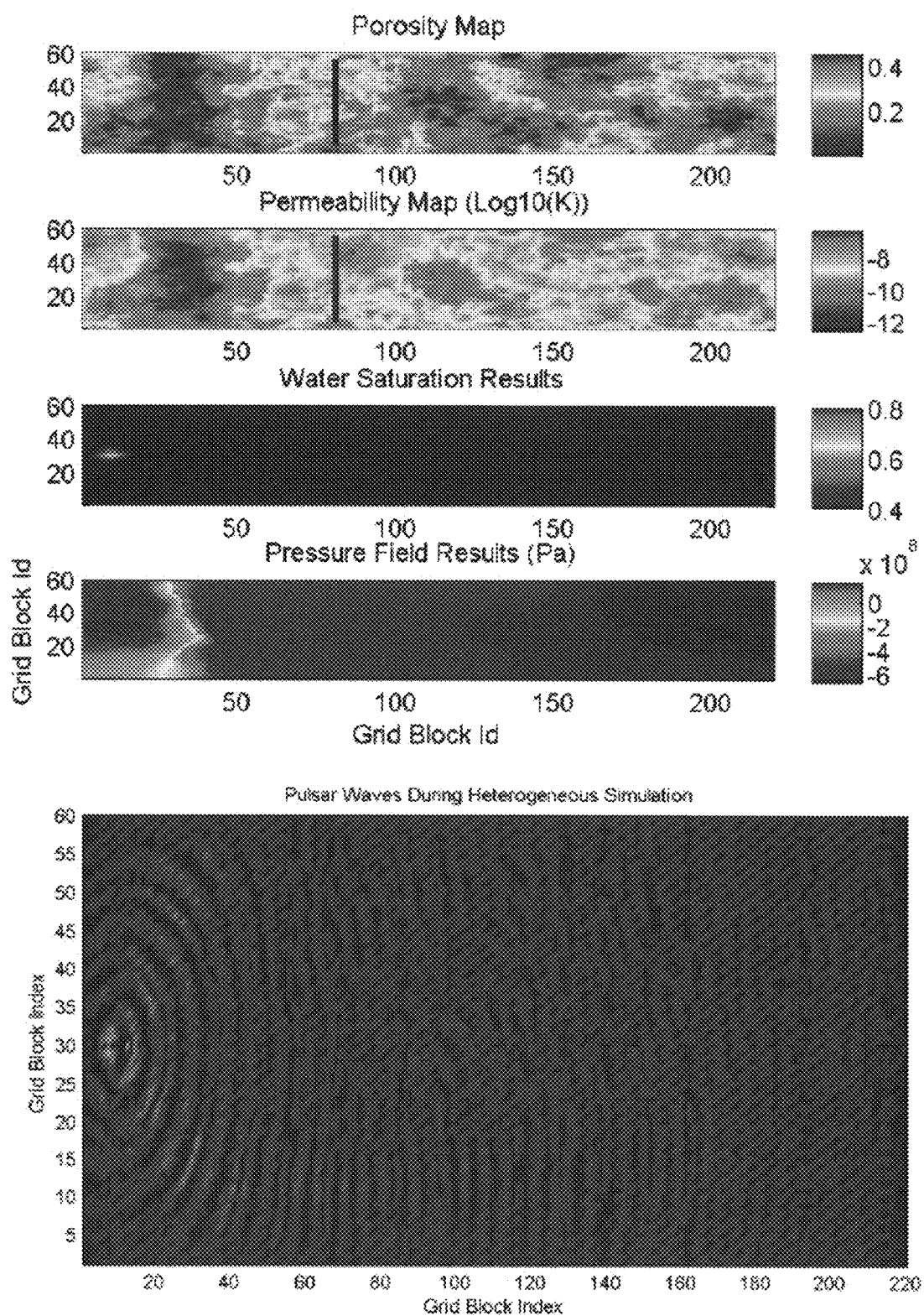
FIG. 13 shows image results obtained for a heterogeneous test environment, showing small signal pressure field emanating from the injector.

FIG. 13 depicts the original heterogeneous reservoir model with an artificial barrier added at the 70th gridblock away from the injection well, and shows small signal pressure field emanating from the injector. The wave pattern of the PULSAR signal are unique from the sonar type pulses used previously are also displayed in FIG. 14, which shows heterogeneous processing results. Here the excitation is continuous as the small signal pressure field with the QPSK modulated PN sequence is injected into the reservoir together with the fluid.

Figure 14:
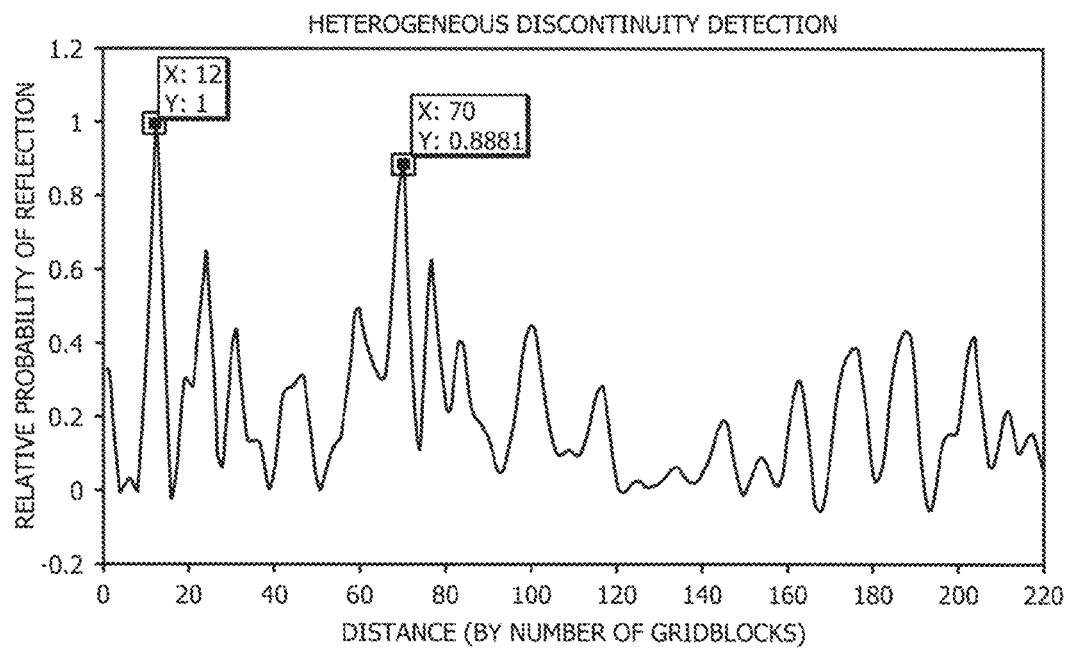
FIG. 14 shows a graph illustrating heterogeneous processing results according to one test using the PULSAR excitation signal.

FIG. 14 shows the detection of reflections from both the sharp change in permeability approximately 12 gridblocks away from the injector as well as successful detection of the artificial barrier placed 70 gridblocks from the injector. This detection was accomplished in a heterogeneous environment and shows that PULSAR can detect multiple features within a heterogeneous reservoir.

Figure 15:
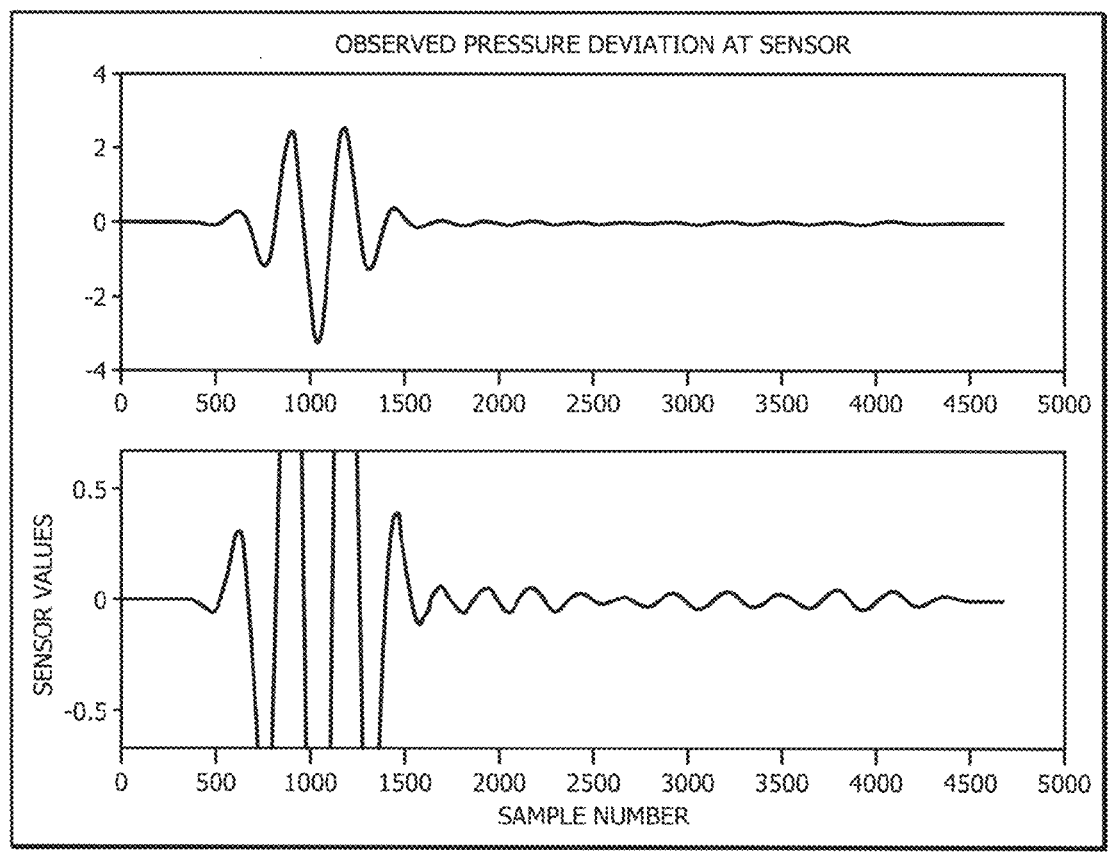
FIG. 15 shows sensor readings while using a sonar type pulse for the test of FIG. 14, where the reflected signal is not a coherent, distinguishable pulse.

FIG. 15 shows sensor readings while using a sonar type pulse for the test. That is, FIG. 15 shows sonar pulse sensor reading with different y axis settings, which shows incident and reflected signals, where the reflected signal is not a coherent, distinguishable pulse. It shows drastic Rayleigh fading where the returning reflections have unknown amplitude, arrival times, and phases. This is due to the fact that the reflections unpredictably interfere constructively and destructively. On the other hand, by using PULSAR signals, reflections are almost orthogonal with each other and can therefore be identified and resolved.

Figure 16:
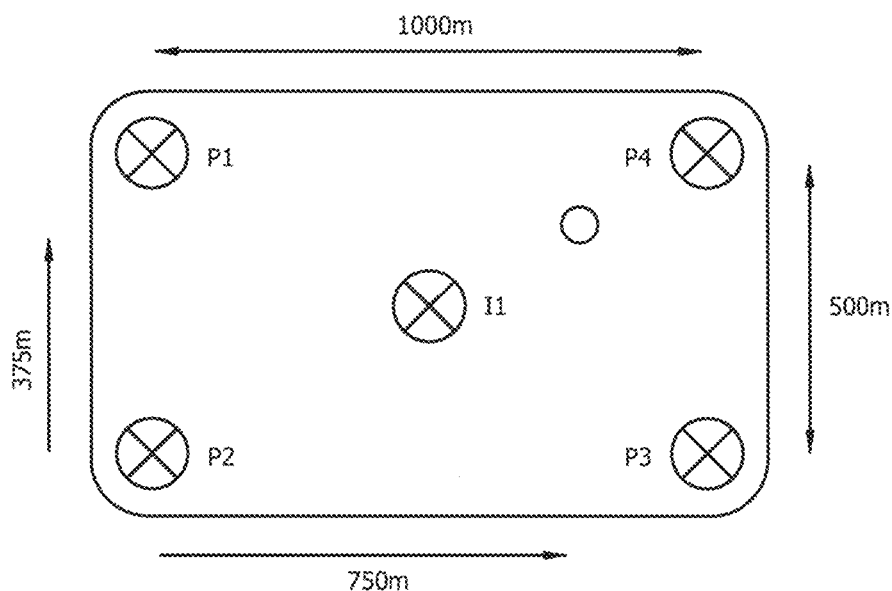
FIG. 16 shows a diagram illustrating a simple homogeneous inverted 5-spot pattern (4 producers denoted P1, P2, P3, and P4 and 1 injector in the middle named I1) used in a test with a non-permeable zone located at 375 m North and 750 m East of producer 2, where the test demonstrates that if multiple PULSAR transducers are in use simultaneously, each one using unique PULSAR codes, then detection of each source signal code can be achieved according to one embodiment of the present invention.

In the final example, as displayed in FIG. 16, a simple homogeneous inverted 5-spot pattern (4 producers denoted P1, P2, P3, and P4 and 1 injector in the middle named I1) is used with a non-permeable zone located at 375 m North and 750 m East of producer 2. The goal of this test is to demonstrate that if multiple PULSAR transducers are in use simultaneously, each one using unique PULSAR codes, then detection of each source signal code can be achieved. For this example, the boundary of the model absorbs 100% of the received signal. The resulting responses of the echoes are processed to determine distances which in turn are used to triangulate the location of the non-permeable zone in the reservoir.

Figure 17:
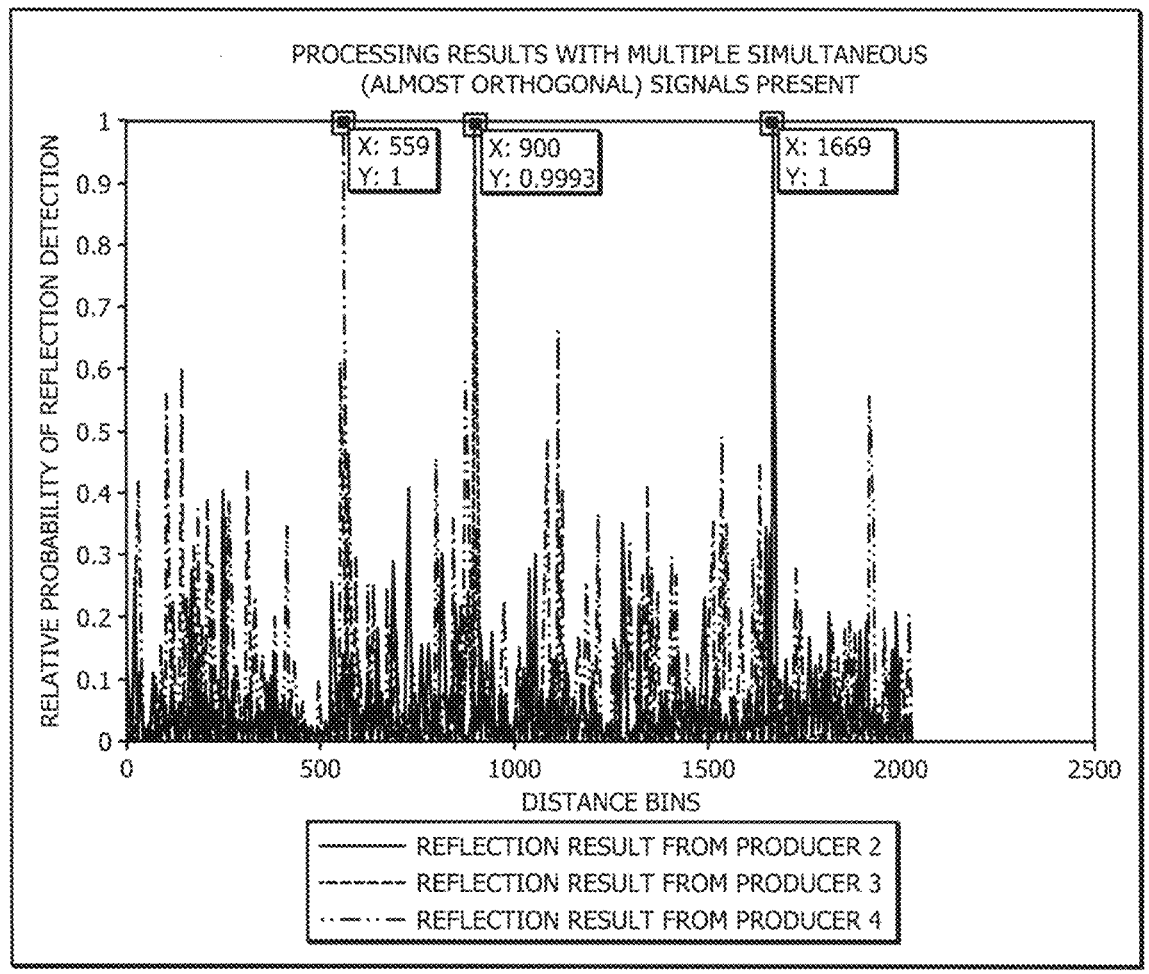
FIG. 17 shows a graph illustrating detection results from multiple producers present in the test environment of FIG. 16 according to one embodiment of the present invention.

In FIG. 17, the processing results from the three producers working simultaneously (P2, P3, and P4) are shown. The results reveal that response signals observed at P2 registered a distance of 1669 m (round trip). Similarly, response signals were observed at P3 (900 m round trip) and P4 (559 m round trip). If a circle with radius of 834.5 m (half of 1669 m) is constructed around P2, a circle of radius of about 900/2=450 m is drawn around P3, and similarly for P4 (reflection at approximately 559/2=279.5 m, then the location of the non-permeable zone is determined within 0.5% of the actual position of the non-permeable zone. The results show that PULSAR predicts the location of the non-permeable zone accurately. The orthogonal based signals allow for specific signal detection in the presence of multiple signals including a reflection of our own transmitted signal. Thus, the resolution of PULSAR is very high.

In FIG. 17 we show the processing results from three producers working simultaneously (P2, P3, and P4). Actual distances are 559/2 for P4, 901/2 for P3 and 1677/2 for P2. The resulting maximum percent difference is 0.5%. We note that our orthogonal based processing allowed for specific signal detection in the presence of multiple signals, including a reflection of our own transmitted signal.

Accordingly, as discussed above, for evaluation of the exemplary PULSAR embodiment, a black oil reservoir simulator was coupled to a wave propagation code to evaluate the use of orthogonal and near orthogonal coded signals for detection of nonpermeable zones in reservoirs. The evaluation reveals that the PULSAR embodiment can be used to resolve features of the reservoir with high accuracy of the order of meters. The orthogonal coded signals allows isolation of each code by detectors so that reflections are clearly detected and isolated from each other, thus permitting highly accurate imaging of the reservoir heterogeneity. Orthogonal or near orthogonal coded signals can be transmitted continuously and simultaneously with multiple transceivers to triangulate properties of porous medium, as well as the phase contents of the porous medium. Thus, the reflective signal processing concepts described herein, which use orthogonally-coded active source signals, provide a more accurate and real-time alternative for in-situ identification and monitoring tasks normally dominated by intensive seismic operations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
continuously inputting, by a source device, a plurality of sufficiently random, orthogonally-coded active source signals to a target site, for an operational time window;
receiving, by a receiver device, a received signal reflected from said target site; and
determining, based at least in part on the sufficiently random orthogonal coding of said source signals, whether said received signal is a reflection of a particular signal of said source signals, wherein said reflection is a time delayed version of said particular source signal, and wherein said source signals are orthogonally-coded to provide orthogonality with respect to time delayed versions of the source signals.

2. The method of claim 1 wherein said particular source signal is sufficiently random so as not to interfere with said delayed version of itself occurring within said operational time window.

3. The method of claim 1 further comprising:
generating, by a signal generator device, said source signals.

4. The method of claim 3 further comprising:
modulating said generated source signals onto a plurality of active source signals being input to said target site by said source device.

5. The method of claim 4 wherein the source device comprises active equipment otherwise working on said target site for some purpose other than inputting said source signals or receiving signals.

6. The method of claim 5 wherein the source device comprises at least one of an injector, a valve, a vibrating device, an oscillator, a flow rate control device, a pressure control device, and an actuator operating at said target location for extracting subterranean hydrocarbon reserves from said target location.

7. The method of claim 1 further comprising:
processing, by a signal processing device, said received signal that is determined to be a reflection of said particular one of said source signals for performing reflected signal analysis.

8. The method of claim 7 wherein said reflected signal analysis comprises analysis of at least one object present in said target site.

9. The method of claim 8 wherein said analysis of at least one object present in said target site comprises imaging of said at least one object.

10. The method of claim 9 wherein said target site comprises a subterranean hydrocarbon-bearing reservoir.

11. The method of claim 9 wherein said target site comprises an internal region of a human or animal body.

12. The method of claim 1 further comprising:
receiving another received signal reflected from said target site; and
distinguishing said received signal, or portion thereof, that is said reflection of said a particular one of said source signals from said another received signal, or portion thereof, that is a reflection of an interference signal, wherein said interference signal refers to any signal that is input to the target site other than said input orthogonally-coded active source signal.

13. The method of claim 1 wherein at least said continuous inputting and said receiving are performed during operation of at least one interference source on said target site.

14. The method of claim 1 wherein at least said continuous inputting and said receiving are performed during operation at said target location of equipment for extracting subterranean hydrocarbon reserves from said target location.

15. A method comprising:
continuously inputting, by a plurality of source devices, a plurality of orthogonally-coded active source signals to a target site for an operational period of time, wherein said orthogonally-coded active source signals are sufficiently random so as not to interfere with delayed versions of themselves occurring within said operational time window;
receiving, by at least one receiver device, a plurality of received signals reflected from said target site, wherein said reflections are a time delayed version of said source signals, and wherein said source signals are orthogonally-coded to provide orthogonality with respect to said time delayed versions of the source signals; and
correlating, based at least in part on the sufficiently random orthogonal coding of said plurality of orthogonally-coded active source signals, said plurality of received signals with said plurality of input orthogonally-coded active source signals.

16. The method of claim 15 further comprising:
generating, by a signal generator device, said plurality of orthogonally-coded active source signals.

17. The method of claim 16 further comprising:
modulating at least one of said generated plurality of orthogonally-coded active source signals onto an active source signal being input to said target site by said source device.

18. The method of claim 17 wherein the source device comprises active equipment otherwise working on said target site for some purpose other than inputting said at least one orthogonally-coded active source signal.

19. The method of claim 15 further comprising:
processing, by a signal processing device, said correlated received signals for performing reflected signal analysis.

20. The method of claim 19 wherein said reflected signal analysis comprises imaging of at least one object present in said target site.

21. The method of claim 1 wherein said time delayed version of said particular source signal has a code offset, wherein the method further comprises:
identifying whether said received signal is a reflection of said particular signal of said source signals based on said code offset.

22. The method of claim 15 further comprising:
identifying said plurality of received signals with using a code offset.

* * * * *

UNITED STATES PATENT AND TRADEMARK OFFICE
CERTIFICATE OF CORRECTION

PATENT NO. : 8,568,320 B2  
APPLICATION NO. : 12/932609  
DATED : October 29, 2013  
INVENTOR(S) : Chris Leskiw It is certified that error appears in the above-identified patent and that said Letters Patent is hereby corrected as shown below:

In the Specifications

At column 18, line number 36, delete "w~($\theta,\sigma^2$I)" and replace with --w~($0,\sigma^2$I)--.

At column 19, line number 59, delete "$H^T H = \in I$" and replace with --$H^T H = \varepsilon I$--.

At column 21, line number 32 ("Equation 28"), delete $E_b = \sigma_1^2$" and replace with --$E_b = \sigma_N^2$--.

At column 21, line number 35 ("Equation 29"), delete "$N_p = \sigma_N^2$" and replace with --$N_o = \sigma_N^2$--.

Signed and Sealed this  
Eleventh Day of March, 2014

Michelle K. Lee  
*Deputy Director of the United States Patent and Trademark Office*